United States Patent
Chatterjee et al.

(10) Patent No.: US 10,346,386 B2
(45) Date of Patent: Jul. 9, 2019

(54) MULTIVERSION CONCURRENCY CONTROL OF DATABASE RECORDS WITH UNCOMMITTED TRANSACTIONS

(71) Applicant: salesforce.com, inc., San Francisco, CA (US)

(72) Inventors: Subho Sanjay Chatterjee, San Francisco, CA (US); Patrick James Helland, San Francisco, CA (US); Nathaniel Wyatt, San Francisco, CA (US); James E. Mace, San Francisco, CA (US); Punit B. Shah, Castro Valley, CA (US)

(73) Assignee: salesforce.com, inc., San Francisco, CA (US)

( * ) Notice: Subject to any disclaimer, the term of this patent is extended or adjusted under 35 U.S.C. 154(b) by 298 days.

(21) Appl. No.: 15/343,969

(22) Filed: Nov. 4, 2016

(65) Prior Publication Data

US 2018/0129693 A1 May 10, 2018

(51) Int. Cl.
*G06F 16/23* (2019.01)

(52) U.S. Cl.
CPC ...... *G06F 16/2343* (2019.01); *G06F 16/2329* (2019.01)

(58) Field of Classification Search
None
See application file for complete search history.

(56) References Cited

U.S. PATENT DOCUMENTS

| 6,785,696 | B2* | 8/2004 | Mosher, Jr. | ......... G06F 11/1471 |
| 7,305,386 | B2* | 12/2007 | Hinshaw | ........... G06F 17/30356 |
| | | | | 707/684 |
| 7,555,481 | B1* | 6/2009 | Verma | ............... G06F 17/30362 |

(Continued)

FOREIGN PATENT DOCUMENTS

| EP | 2608073 | 6/2013 |
| EP | 2608073 A1 | 6/2013 |

OTHER PUBLICATIONS

Larson et al. "High-Performance Concurrency Control Mechanisms for Main-Memory Databases", Dec. 2011, ACM, pp. 298-309. (Year: 2011).*

(Continued)

*Primary Examiner* — Debbie M Le
(74) *Attorney, Agent, or Firm* — Morris & Kamlay LLP

(57) ABSTRACT

Systems and methods provide multi-version concurrency control of database records with uncommitted transactions. The system and methods may include receiving a query regarding a transaction counter number. When a transaction header identifying data is updated with the assigned transaction counter number, the updated transaction header may be used in identifying data as an instance of multiversion concurrency control information by the received query. A key lookup may be performed, and when the key lookup encounters an uncommitted row for a transaction number, a corresponding transaction header identifying data to identify a data array element to determine whether the transaction number is committed, and determining the transaction counter number when the transaction number is committed. The (Continued)

transaction counter number may be stamped on the row version record when it is determined that the row is committed.

44 Claims, 11 Drawing Sheets

(56) References Cited

U.S. PATENT DOCUMENTS

| | | | | |
|---|---|---|---|---|
| 8,407,195 | B2* | 3/2013 | Larson | G06F 17/30545 |
| | | | | 707/704 |
| 8,713,046 | B2* | 4/2014 | Vishnoi | G06F 17/30362 |
| | | | | 707/649 |
| 9,483,516 | B2* | 11/2016 | Lee | G06F 17/30353 |
| 9,529,849 | B2* | 12/2016 | Seputis | G06F 17/30457 |
| 2015/0302397 | A1* | 10/2015 | Kalgi | G06Q 20/36 |
| | | | | 705/65 |
| 2016/0147906 | A1* | 5/2016 | Schreter | G06F 17/30991 |
| | | | | 707/781 |
| 2016/0314162 | A1 | 10/2016 | Tarta et al. | |
| 2017/0116252 | A1* | 4/2017 | Krishnaswamy | |
| | | | | G06F 17/30581 |

OTHER PUBLICATIONS

Dibyendu Majumdar: "A Quick Survey of Multi Version Concurrency Algorithms", Jan. 14, 2006 (Jan. 14, 2006), XP055104499, Retrieved from the Internet: URL:http://forge.ow2.org/docman/view.php/237/132/mvcc-survey.pdf [retrieved on Feb. 26, 2014] section 1.2.

Invitation to pay additional fees dated Jan. 3, 2018 as received in Application No. PCT/US2017/059907.

Dibyendu Majumdar: "A Quick Survey of MultiVersion Concurrency Algorithms", Jan. 14, 2006 (Jan. 14, 2006), XP055104499, Retrieved from the Internet: URL:http://forge.ow2.org/docman/view.php/2 37/132/mvcc-survey.pdf [retrieved on Feb. 26, 2014].

Klaus Aschenbrenner: "Introduction to Latches in SQL Server 23/introduction-to-latch Introduction to Latches in SQL Server", Jun. 23, 2014 (Jun. 23, 2014), XP055458133, Retrieved from the Internet: URL:https://www.sqlpassion.at/archive/2014 /06/23/ introduction-to-latches-in-sql-sery er/ [retrieved on Mar. 9, 2018].

David Lomet et al: "Immortal DB", SIGMOD 2005: Proceedings of the ACM SIGMOD International Conference on Management of Data ; Baltimore, Maryland, Jun. 14-16, 2005, Association for Computing Machinery, New York, NY, Jun. 14, 2005 (Jun. 14, 2005), pp. 939-941, XP058158701, DOI: 10.1145/1066157.1066295.

Jose M. Faleiro et al: "Rethinking serializable multiversion concurrency control", Proceedings of the VLDB Endowment, vol. 8, No. 11, Jul. 1, 2015 (Jul. 1, 2015), pp. 1190-1201, XP055459421, New York, NY.

PCT International Search Report for PCT/US2017/059907 dated Mar. 21, 2018.

* cited by examiner

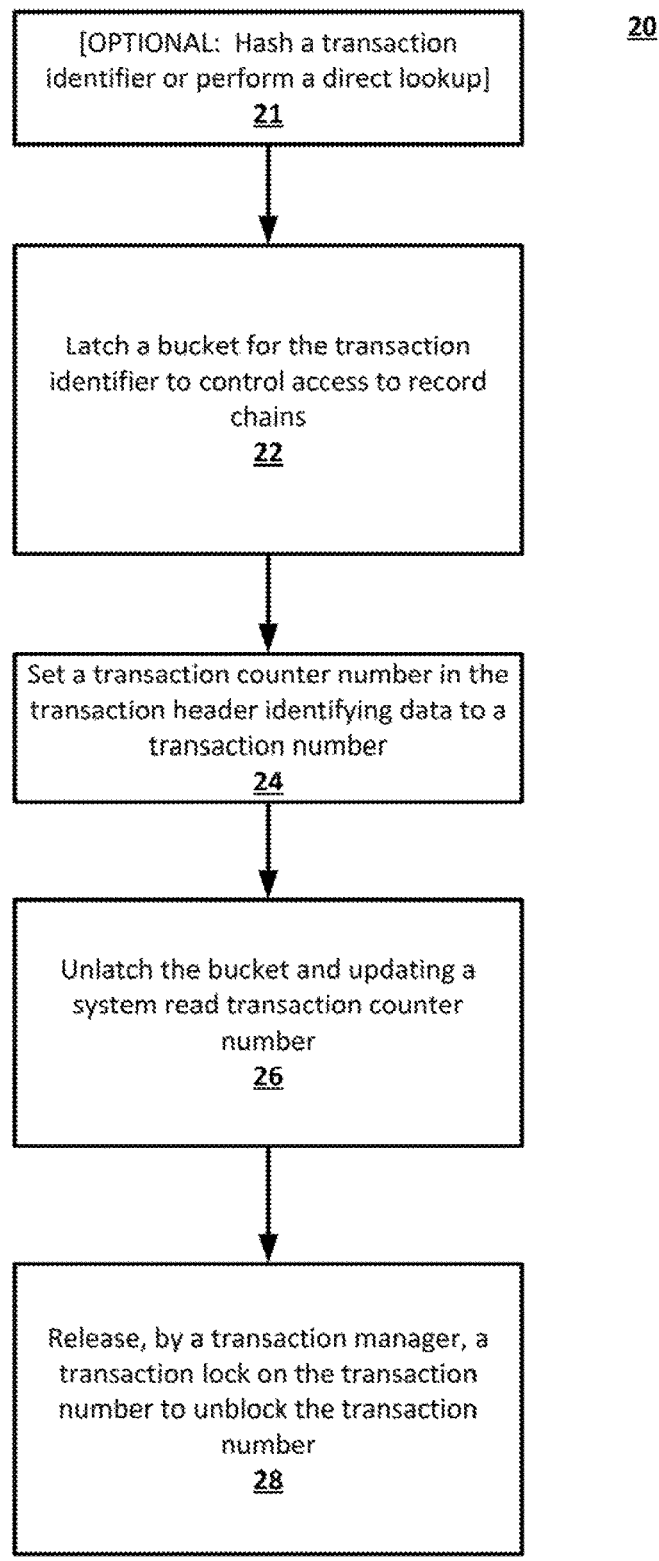

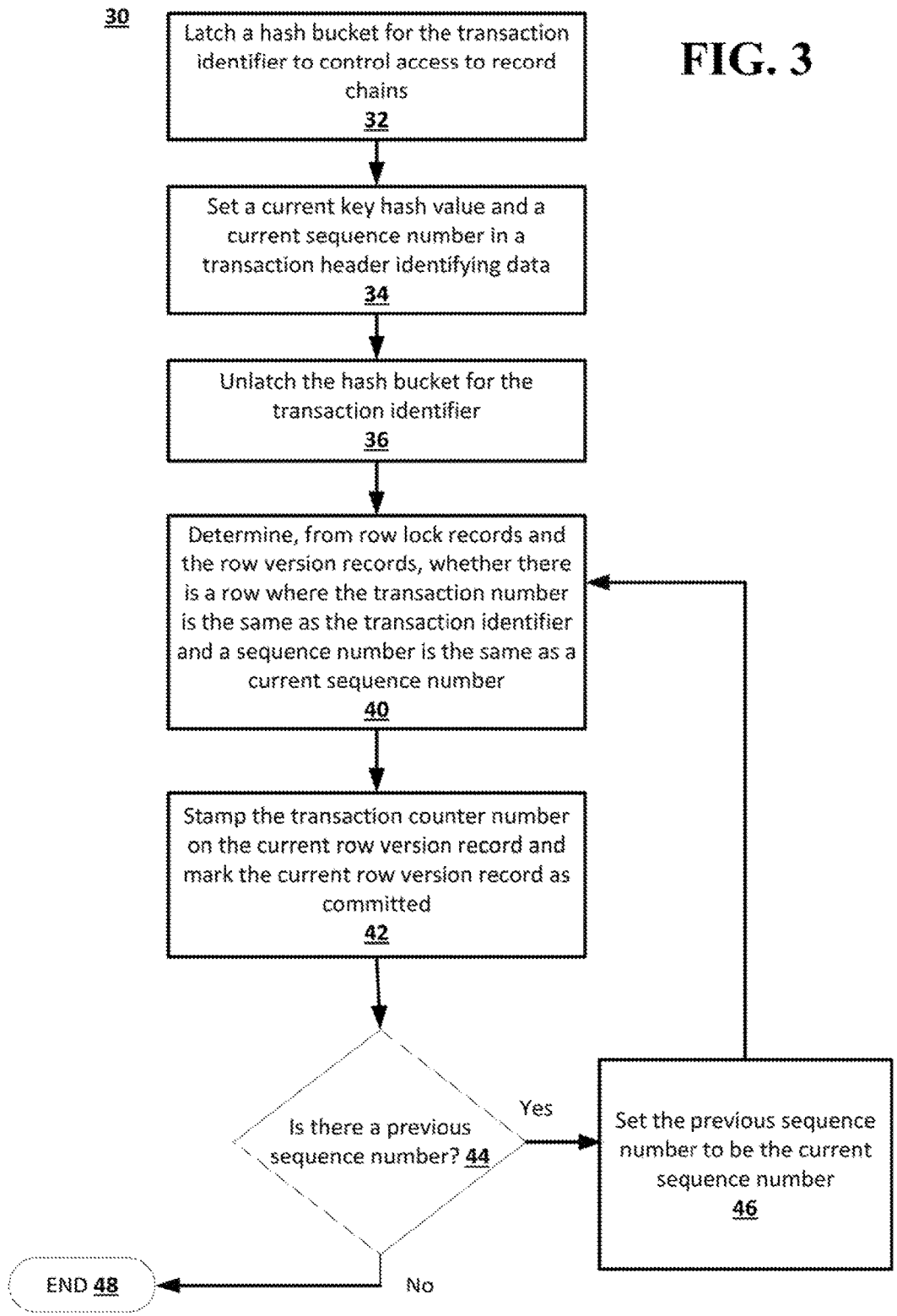

US 10,346,386 B2

MULTIVERSION CONCURRENCY CONTROL OF DATABASE RECORDS WITH UNCOMMITTED TRANSACTIONS

BACKGROUND

Records stored in a database system may be distinguished from each other based on various identifiers. A database system may support multiple tenants, each of which may store records in the database system. The database system may have different versions of the database records stored in different locations, as the status of transactions or records may be updated at different locations at different times. Typical database systems may attempt to control the concurrency of the records stored at the different locations so that the database system experience is similar when queries to the system are made from different locations. However, records stored at one location may be more current than records stored at a different location, and there may be discrepancies when a query is made to the database system.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIG. 2 shows an example method of committing a transaction to a record when the transaction is not visible according to an implementation of the disclosed subject matter.

FIG. 3 shows an example method of committing a transaction to a record when the transaction is visible according to an implementation of the disclosed subject matter.

DETAILED DESCRIPTION

Figure 1:
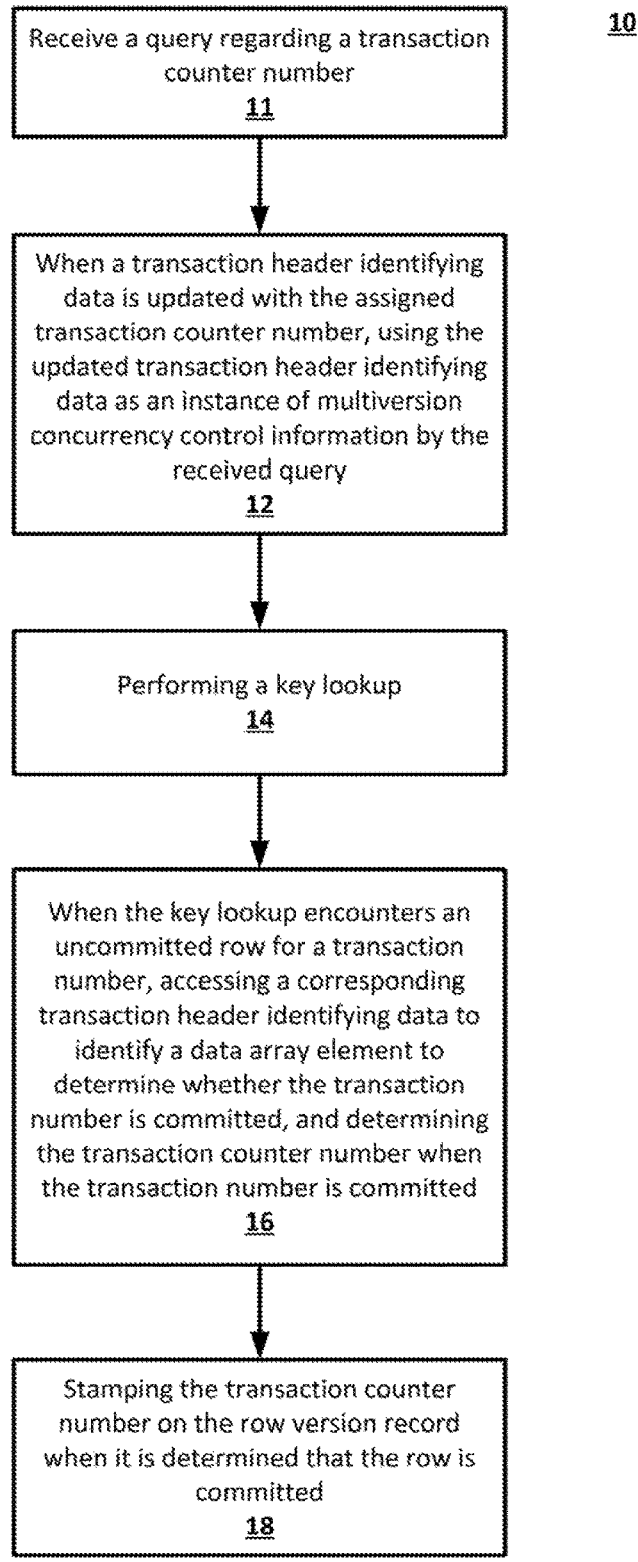
FIG. 1 shows an example method of stamping transactions so that a transaction counter number may be used as a multiversion concurrency control (MVCC) according to an implementation of the disclosed subject matter.

In implementations disclosed herein, transaction identifiers such as transaction numbers may be associated with each update of a record stored on a server system. When a transaction header is updated with an assigned transaction counter number, new queries may use this assigned transaction counter number as their multiversion concurrency control (MVCC) snapshot. In implementations of the disclosed subject matter, row lookup operations may encounter row records that appear to be uncommitted, as the row records may not have a transaction counter number assigned to them (i.e., a transaction counter number may not be stamped on them). The row records may be in the process of being stamped (i.e., so as to become committed) in a concurrent operation.

Key lookups encountering an apparently uncommitted row for a transaction number may access the corresponding transaction header to determine whether that transaction number is committed. When the transaction number is determined to be committed, a transaction counter number may be determined. When the row is determined to be committed, one or more operations performing the lookup may assign (i.e., stamp) the transaction counter number on the row record version.

The system, which may be finishing up the commit-time processing for the transaction, may visit the rows affected by the transaction. The system may stamp the rows with the transaction counter number, if a concurrent lookup has not done so, and may release any row locks. That is, the assignment of a transaction commit number to a transaction header record may commit the transaction, and the row locks may be released based on the commitment of the transaction. Knowledge of the commitment may be transferred to the row records during this final phase of commit-time processing. Although larger transactions may take longer to finish commit-time processing, it will not prevent the processing of other commit transactions. Additionally, concurrent transactions with appropriate MVCC snapshots may not need to wait for commit-time processing to complete in order to access the affected rows. In the systems and methods disclosed herein, it may suffice for the transaction counter number to be stamped either via key lookups or by ongoing commit-time processing.

Multi-tenancy may allow various tenants, which may be, for example, users, groups of users, or organizations, to access their own records on the server system through software tools or instances on the server system that may be shared among the various tenants. The records for each tenant may be part of a database for that tenant. Records for multiple tenants may all be stored together within the same server system, but each tenant may only be able to access records which belong to, or were created by, that tenant. This may allow a server system to enable multi-tenancy without having to store each tenants' records separately, for example, on separate servers or server systems. The database for a tenant may be, for example, a relational database, hierarchical database, or any other suitable database type. All records stored on the server system may be stored in any suitable structure, including, for example, a log-structured merge (LSM) tree.

A record as disclosed herein may be identified by a key-value pair in the instance of a multi-tenant system. The value may be, for example, the contents of a row of a table of a relational database, an identification of a row in a table of a relational database, or any other suitable value. The key may be an identifier for the record, and may in any suitable form, such as, for example, an alphanumeric sequence. Portions of the key may provide information about the record. For example, a portion of the key may be a tenant identifier, which may uniquely identify the tenant to whom the record belongs. Other portions of the key may identify, for example, a table number and identification of a row, for example, when the value of record is the contents of a row, or table number, index number on the table, and an identification of indexed columns when the value is the identification of a row.

Further, a multitenant system may have various tenant instances on server systems distributed throughout a network with a computing system at each node. The live or production database instance of each tenant may only have its transactions processed at one computer system. The computing system for processing the transactions of that instance may also process transactions of other instances for other tenants. Each server system may assign an unique (for the tenant's instance) transaction number in a strictly increasing or decreasing sequence in the order the transactions are being committed by that server system for that live or production instance of that tenant. Further, each server system may assign an unique (for the tenant's instance) transaction number in a strictly increasing or decreasing sequence in the order the transactions are being committed by that particular server system for a live or production instance of that tenant. For other server systems at other nodes, they may likewise use the same transaction number assignment schema for committing transactions.

As discussed in detail below, FIGS. 1-4B show methods of committing a transaction according to example implementations of the disclosed subject matter, and FIGS. 5-11 show example arrangement suitable for transaction counter number assignment according to example implementations of the disclosed subject matter. Examples using the methods and arrangements described in connection with FIGS. 1-11 follows the discussion of these methods and arrangements.

FIG. 1 shows an example method 10 of stamping transactions so that a transaction counter number may be used as a multiversion concurrency control (MVCC) according to an implementation of the disclosed subject matter. At operation 11, a server system and/or a database system (e.g., server system 100 of FIGS. 5-9, database 1200a-d of FIG. 10) may receive a query regarding a transaction counter number from a computer (e.g., computer 600 and/or second computer 800 shown in FIG. 9, and/or another server system, such as server system 400 shown in FIG. 7). When a transaction header identifying data is updated with the assigned transaction counter number (e.g., from the transaction number manager 130 of FIG. 5), the updated transaction header identifying data may be used as an instance of multiversion concurrency control information by the received query at operation 12. The server system 100 may perform a key lookup at operation 14. For example, the server system 100 may perform a key lookup operation on the uncommitted transactions 145 and/or the record versions 160 shown in FIG. 5.

At operation 16, when the key lookup encounters an uncommitted row in the storage 140 for a transaction number, a corresponding transaction header identifying data may be accessed to identify a data array element in the storage 140 to determine whether the transaction number is committed. As shown, for example, in FIG. 5, the storage 140 may have uncommitted transactions 145, and/or may have record versions 160, which may have committed transactions (e.g., transaction numbers 191, 192, 193, 194, 195, 196, 197, and/or 198). The transaction counter number may be determined when the transaction number is committed (e.g., the transaction number is among the records of the record versions 160 of the storage 140). In some implementations of the disclosed subject matter, the accessing the corresponding transaction header in operation 16 (e.g., the headers of the uncommitted transactions 145 and/or the record versions 160) may include identifying the data array element using a transaction header index field on the row version record and a row lock record. The data array element may be identified using the values 155, 156, 157, and/or 158 of the uncommitted transactions 145, and/or the values 181, 182, 183, 184, 185, 186, 187, and/or 188 of the record versions 160. At operation 18, the transaction counter number may be stamped on the row version record (e.g., by the transaction number manager 130) when it is determined that the row is committed.

In some implementations of the disclosed subject matter, each row affected by a transaction having the transaction identifier may be stamped with the transaction counter number, and any row locks may be released.

Figure 5:
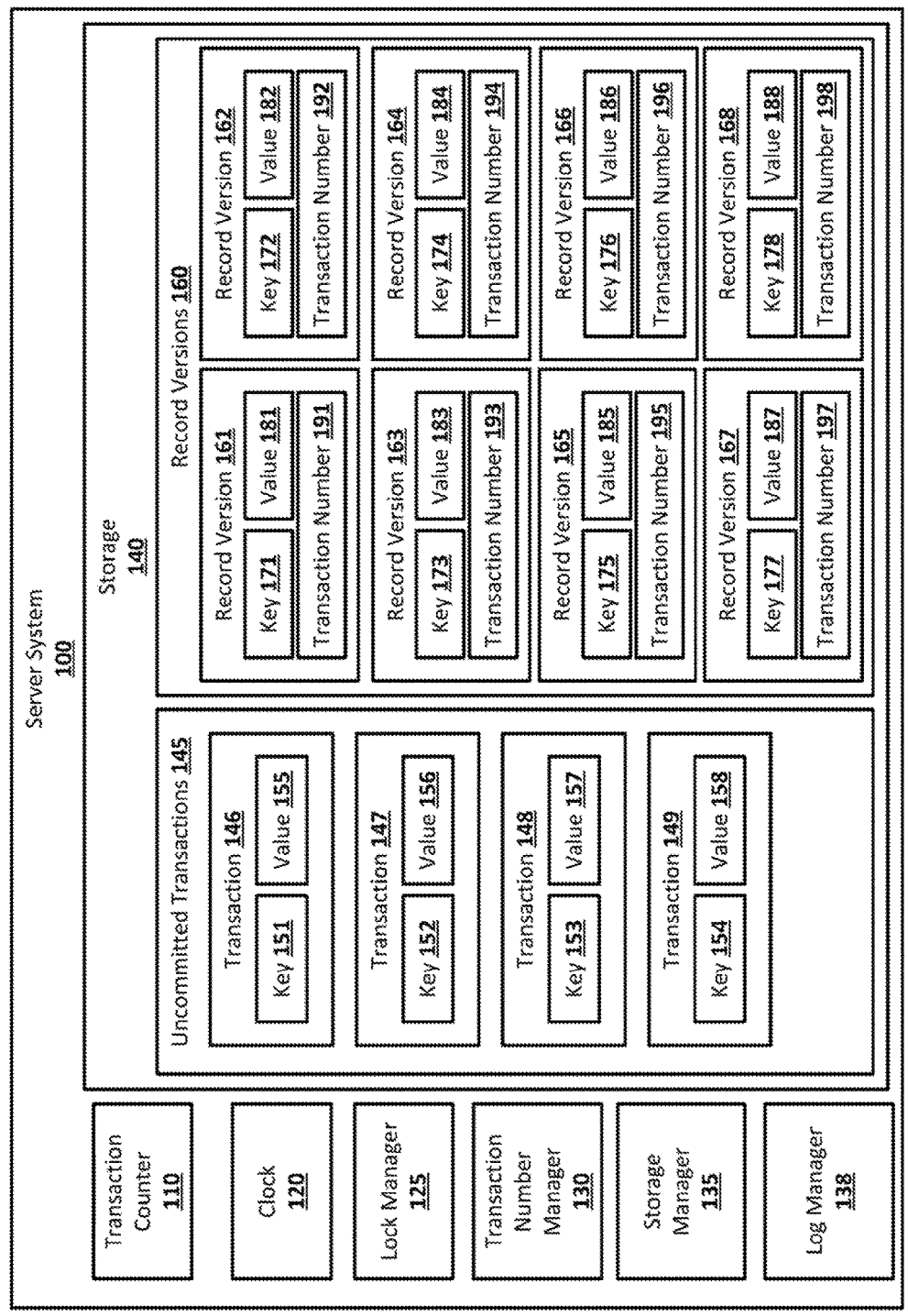
FIG. 5 shows a functional block diagram of an example system suitable for transaction counter number assignment (i.e., "stamping") according to an implementation of the disclosed subject matter.

In some implementations, a row lookup may be performed when one or more row lookup records are uncommitted (e.g., the row records are part of the uncommitted transactions 145 shown in FIG. 5), such that the one or more row lookup records are uncommitted when they are not stamped with the transaction counter number. That is, one or more uncommitted row lookup records may be processed by the server system 100 while the one or more uncommitted records are not externally visible to queries.

FIG. 2 shows an example method 20 of committing a transaction to a record when the transaction is not visible (i.e., not visible to queries) according to an implementation of the disclosed subject matter. In some implementations, the method 20 may include an optional operation 21. At optional operation 21, a transaction identifier may be hashed by the server system (e.g., server system 100 shown in FIG. 5). As an alternative to hashing, the server system (e.g., server system 100 shown in FIG. 5) may perform, at operation 21, a direct look-up of the transaction identifier. A bucket for the transaction identifier (e.g., transactions 146, 147, 148, and/or 149 of the uncommitted transactions 145) may be latched at operation 22 to control access to record chains. If a hash operation was performed at operation 21, the bucket may include the hash of the transaction identifier (e.g., which may be part of the value 155, 156, 157, and/or 158 as shown in FIG. 5, or may be part of the transactions 146, 147, 148, and/or 149), and any hash collisions from the hashing the transaction identifier may be resolved at operation 22. At operation 24, a transaction counter number may be set in the transaction header identifying data to a transaction number (e.g., by the transaction number manager 130 shown in FIG. 5). The bucket may be unlatched, and a system read transaction counter number may be updated (e.g., by the transaction number manager 130 and/or the storage manager 135) at operation 26. A transaction lock (e.g., a top level transaction lock) on the transaction number may be released by a transaction manager to unblock the transaction number at operation 28.

In some implementations, the setting of the transaction counter number in the transaction header identifying data at operation 24 may further include releasing all row locks associated with the transaction. The setting of the transaction counter number in the transaction header identifying data may make the transaction visible to one or more queries.

FIG. 3 shows an example method 30 of committing a transaction to a record when the transaction is visible (i.e., visible to queries) according to an implementation of the disclosed subject matter. At operation 32, a hash bucket for the transaction identifier (e.g., the transaction number 191, 192, 193, 194, 195, 196, 197, and/or 198 shown in FIG. 5) may be latched to control access to record chains (e.g., that may be stored in storage 140). A current key hash value and a current sequence number in a transaction header identifying data may be set at operation 34 (e.g., by the transaction number manager 130 and/or the storage manager 135), and the hash bucket may be unlatched for the transaction identifier (e.g., by the transaction number manager 130 and/or the storage manager 135) at operation 36. Operation 40 may determine from row lock records and row version records whether there is a row (e.g., in the record versions 160 of storage 140) where the transaction number is the same as the transaction identifier, and a sequence number is the same as a current sequence number. When it is determined the transaction number is the same as the transaction identifier, and the sequence number is the same as a current sequence number, the transaction counter number may be stamped on the current row version record (e.g., by the transaction number manager 130 shown in FIG. 5), and the current row version record may be marked as committed at operation 42.

In some implementations of the disclosed subject matter, when the row identifier does not equal the transaction identifier, or when the row identifier equals the transaction identifier and the row sequence number is greater than or equal to the current sequence number, the server system 100 may move to the next row version in the records (e.g., record versions 160) in the storage 140 (e.g., according to operations 44, 46, and/or 48 of the method 30 shown in FIG. 3).

Operation 44 may determine whether there is a previous sequence number. When there is a previous sequence number, operation 46 may set the previous sequence number to be the current sequence number. When there is no previous sequence number, the method 30 may be stopped by operation 48.

In some implementations, when the transaction number is the same as the transaction identifier and the sequence number is the same as a current sequence number for one of the row lock records, one of the row lock records may be removed from a storage device (e.g., storage 140 shown in FIG. 5). That is, the row locks may be removed and/or released when the transaction counter number is stamped on the current row version record (e.g., by the transaction number manager 130 shown in FIG. 5), and the current row version record may be marked as committed (i.e., at operation 42).

In some implementations of the disclosed subject matter, the method 30 may include setting current key hash to the previous key hash, setting the current sequence number to the previous sequence number, and unlatching a key bucket, where the latch controls access to the record chains in the storage 140. In some implementations, the method 30 may perform a direct look-up a key, and then may set the current sequence number to the previous sequence number and unlatch the key bucket. When the previous sequence number reaches a terminal value, the review of the record chain may be stopped (e.g., by the transaction number manager 130 and/or the storage manager 135). When the previous sequence number is not the terminal value, the new row version record in the record chain may be reviewed (e.g., by the transaction number manager 130).

The method 30 of the disclosed subject matter may also include hashing a transaction identifier, and resolving any hash collisions from the hashing the transaction identifier. In some implementations, rather than hashing a transaction identifier, the server system (e.g., server system 100 shown in FIG. 5) may perform a direct look-up of the transaction identifier.

Figure 4A:
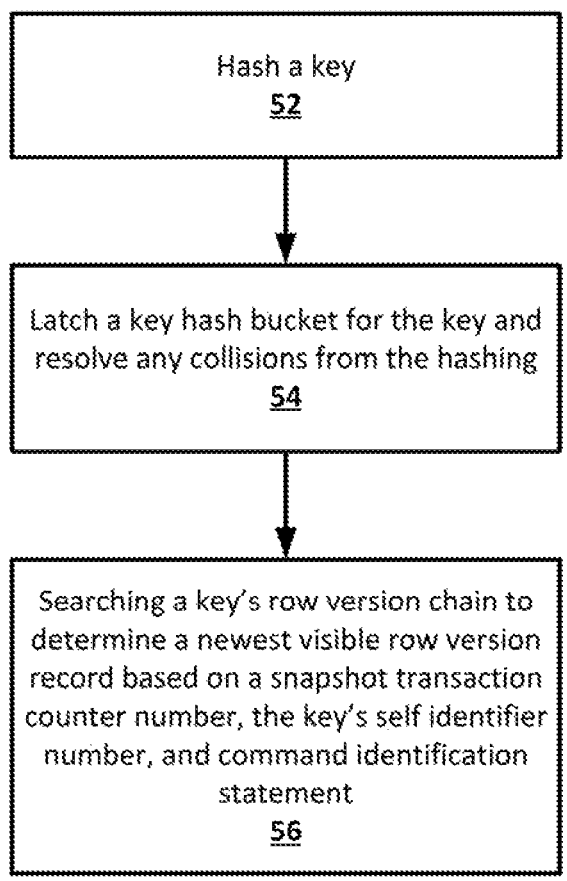
FIGS. 4A-4B show example methods of looking up transactions in a record according to an implementation of the disclosed subject matter.
Figure 4B:
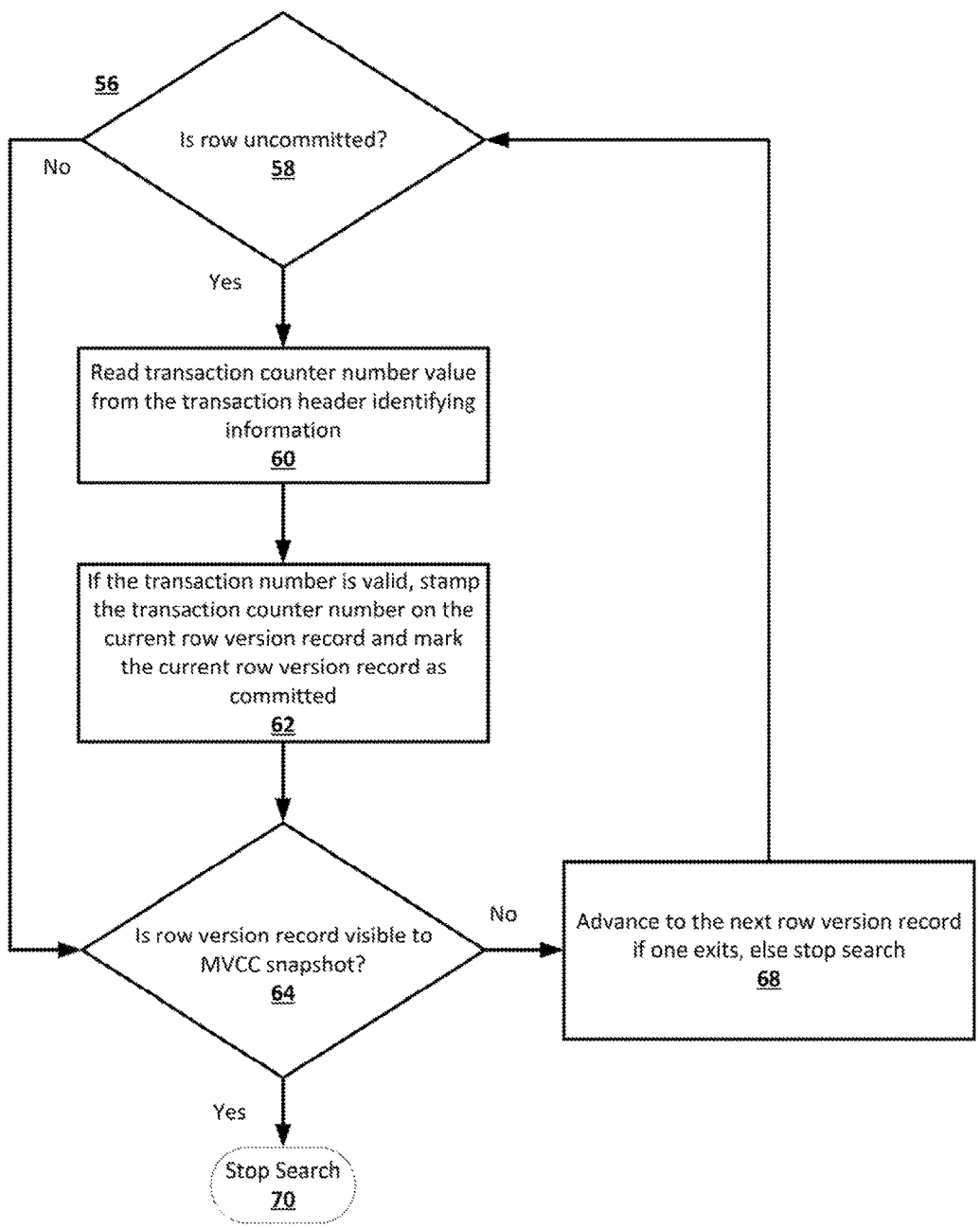

FIGS. 4A-4B show example methods of looking up transactions in a record according to an implementation of the disclosed subject matter. FIG. 4A shows an example method 50, which searches rows in a record to determine whether a row is committed or not. If a row is uncommitted, the transaction header can be checked, and the transaction counter number can be stamped on the current row version record so as to mark it as being committed.

At operation 52 of method 50, a key may be hashed by the server system (e.g., server system 100 shown in FIG. 5). A key hash bucket may be latched for the key at operation 54, and any collisions from the hashing may be resolved. At operation 56, a key's row version chain may be searched (e.g., by the transaction number manager 130 and/or storage manager 130) to determine a newest visible row version record based on a snapshot transaction counter number, the key's self identifier number, and a command identification statement which may be stored in the storage 140.

FIG. 4B shows example operations that may be included in searching a key's row version chain in the storage 140 shown in FIG. 5 to determine a newest visible row record at operation 56. At operation 58, it is determined whether a row is uncommitted. At operation 58, when it is determined that a row is uncommitted such that there is no locking (e.g., an uncommitted transaction), the transaction counter number value may be read from the transaction header identifying information at operation 60. At operation 62, if the transaction counter number is valid, the transaction counter number may be stamped on the current row version record (e.g., by the transaction number manager 130), and the current row version record may be marked as committed. As shown in FIG. 5, committed transactions may be stored in the record versions 160 of the storage 140. When the operation 58 determines that the row version is committed or operation 62 has been completed, operation 64 may determine whether a row version is visible to an MVCC snapshot (e.g., that the row version may be used as part of the MVCC snapshot). When operation 64 determines that the row version is visible to the MVCC snapshot, operation 70 may stop the search. When operation 64 determines that the row version is not visible to the MVCC snapshot, operation 68 advances to the next row version if one exists, and performs operation 58, or may stop the search if the next row version does not exit.

In the method 50 shown in FIGS. 4A-4B, the chain of records may be traversed (i.e., the method may "walk" the chain of records) when searching for a key. When the key being searched for is found at a point in the chain of records, the method 50 may determine whether the row is uncommitted, and, if so, read the header information and stamp the transaction counter number on the current row version record so as to make it committed. When the key being searched for is found at a point in the chain of records and the row is committed, the search may be stopped. The method 60 may also be stopped when the chain of records is traversed in its entirety (i.e., the method "walks" the entire length of the chain of records), and the key is not found.

FIG. 5 shows a functional block diagram of an example system suitable for transaction number assignment according to an implementation of the disclosed subject matter. For example, the server system 100 may be part of a suitable database management system such as Postgres, Mysql or Oracle Database 12c running in association with Apache Hadoop. The server system 100 may include a transaction counter 110, a clock 120, a lock manager 125, a transaction number manager 130, a storage manager 135, a log manager 138, and storage 140. The server system 100 may be any suitable computing device, such as, for example, a computer 600 as described in FIG. 10, or component thereof, for implementing the counter 110, the clock 120, the lock manager 125, the transaction number manager 130, the storage manager 135, the log manager 138, and the storage 140. The server system 100 may be a single computing device, or may include multiple connected computing devices, and may be, for example, a laptop, a desktop, an individual server, a server cluster, a server farm, or a distributed server system, or may be a virtual computing device or system, or any suitable combination of physical and virtual systems. For simplicity, generic components such as the processor, short and long term storage, the operating system, much of the database management system are not shown. The server system 100 may be part of a computing system and network infrastructure, or may be otherwise connected to the computing system and network infrastructure, including a larger server network which may include other server systems similar to the server system 100.

The transaction counter 110 of the server system 100 may be any suitable combination of hardware and software on the server system 100 for storing and updating the value of a transaction counter number. The clock 120 may be any suitable combination of hardware and software on the server system 100 for tracking time, such as the current time, or time elapsed from some point in time, in a time value at a desired precision. The lock manager 125 may be suitable combination of hardware and software on the server system 100 for managing the locking and/or unlocking of transaction number hash buckets and/or key hash buckets of the uncommitted transactions 145 and/or the record versions 160. The transaction number manager 130 may be any suitable combination of hardware and software on the server system 100 for assigning transaction numbers to transactions when the transactions are committed on the server system 100 or in the order that they are being committed, and for managing the counter 110 and the value of the counter number. The storage manager 135 may be any suitable combination of hardware and software for retrieving records from the storage of server system 100 such as commonly found in database management systems, for example, which may include the storage 140. The storage manager 135 may retrieve versions of records in response to a request that may include a key and a time value or a key and a transaction number. The log manager 138 may be suitable combination of hardware and software on the server system 100 for logging the status of the lock manager 125, transaction number manager 130, and/or storage 140. The log manager 138 may, for example, log the insertions for one or more records in a record chain of transactions. A transaction number, a primary key value, and/or a row value may be logged as part of a record. The storage 140 may be any suitable storage on the server system 100 for storing uncommitted transactions 145, and record versions 160. The record versions 160 may be versions of records for databases for one or more users, or tenants, of the server system 100.

The server system 100, and the database for the tenant, may store transactions as immutable versions of given records. Immutable versions of records already stored on the server system may be unchanged until they are deleted (if ever) from the server system. That is, a received transaction may create a new version of a record to be stored in the server system, instead of altering data stored in an existing version of a record. Thus, it may be possible for multiple versions of a record as disclosed herein to have identical keys. The use of identical keys for versions of a given record may allow for the changing of data stored in the relational database. As such each version of the record may be immutable; i.e., it is either never deleted or is never deleted over an arbitrarily long period of time that may be months, years or decades. For example, a later version of a record with an identical key to an earlier version of the record may indicate a change in the data value for that record. Alternatively, a transaction may create a record or delete a record but the deletion of the record may not remove the transactions.

The transaction counter 110 may be any suitable combination of hardware and software for storing and updating the value of a counter number. The transaction counter 110 may be, for example, a hardware or software register or other form of memory on the server system 100, and may store a counter number of any suitable size. The transaction counter 110 may prevent duplicate transaction numbers for transactions being committed by the computer system 100 and may provide transaction numbers that are either strictly increasing or decreasing. For example, the counter number may be stored as a 64-bit number. A transaction number assigned to a transaction when the transaction is committed may be based on a counter, such as the transaction counter 110. Alternatively, a transaction number may include two separate fields. A first field may represent a time stamp and with the counter providing a second field which may represent the number of transactions since the last time stamp. Such a transaction number with both a time stamp and a transaction count indicating the number transactions since the time stamp will strictly increase. In such an implementation, transactions being committed will have a unique transaction number associated or assigned to the transaction.

The transaction counter 110 may be able to update the value of the counter number. After a transaction number is assigned when committing a transaction, the value of the counter number may be incremented by any suitable amount. For example, the value of the counter number may be increased by one or an integer greater than one unless a synchronization event has occurred. There may be a gap of any size between consecutively assigned transaction numbers so long as no two transaction numbers are identical and they are strictly either increasing or decreasing. Each transaction committed on the server system may be assigned a transaction number based on the current value of the counter number, which may then be incremented so that the next transaction may be assigned the incremented number before being committed.

For example, the value of the counter number may be used to assign a transaction number to one of the uncommitted transactions 145, for example, the transaction 146, when the transaction is committed or immediately before the transaction is committed. After the value of the counter number from the transaction counter 110 is used to assign a transaction number, the transaction counter 110 may be able to update the value of the counter number, for example, strictly incrementing (or strictly decrementing) the counter number by any suitable amount. The transaction counter 110 may also be able to update the value of the counter based on a new value for the counter number received from, for example, the transaction number manager 130 or the clock 120. For example, the transaction counter 110 may set the initial value of the counter number, before any transactions have been committed on the server system 100, based on the time value of the clock during an initial synchronization.

The clock 120 may be any suitable combination of hardware and software on for tracking time, such as the current time, or time elapsed from some point in time, in a time value with any suitable precision. For example, the clock may be a software system clock, a hardware clock, or a counter that updates based on a signal which oscillates at a known frequency. For example, the clock may be a 64-bit microsecond counter, which means the clock will provide unique values for approximately five hundred and eighty four thousand five hundred and fifty years. The time value stored by the clock may represent the current time in any suitable manner. For example, the time value may indicate the amount of time, in microseconds, that has elapsed from some previously specified point in time, and may convertible into the current time based on this previously specified point in time. The clock 120 may synchronize with any suitable external clock at any suitable time or interval, or may only keep time internally, without external synchronization.

The lock manager 125 may be suitable combination of hardware and software on the server system 100 for managing the locking and/or unlocking of transactions, transaction number hash buckets, and/or key hash buckets of the uncommitted transactions 145 and/or the record versions 160. The lock manager may lock and/or unlock one or more of the uncommitted transactions 145 (e.g., transactions 146, 147, 148, and/or 149), and/or the keys 151, 152, 153, and/or 154. In some implementations, the lock manager 125 may control the locking and/or unlocking of the record versions 160 (e.g., record versions 161, 162, 163, 164, 165, 166, 167, and/or 168).

The transaction number manager 130 may be any suitable combination of hardware and for assigning transaction numbers to transactions when the transactions are committed on the server system 100, and for managing the transaction counter 110 and the value of the counter number. The transaction number manager 130 may be able to assign to an uncommitted transaction 145, such as any of transaction 146, 147, 148, or 149, a transaction number when the transaction is to be committed. The transaction number assigned to one of the uncommitted transactions 145 that is being committed may be based on the value of the counter number stored by the transaction counter 110. For example, the transaction number may be the current value of the counter number. After a transaction number is assigned based on the value of the counter number, the value of the counter number may be updated. The transaction counter 110 may be able to update the value of the counter number on its own, or the transaction number manager 130 may be able to cause the transaction counter 110 to update the value of the counter number. The transaction number manager 130 may also cause the transaction counter 110 to update the value of the counter number based on any suitable event.

The storage manager 135 may be any suitable any suitable combination of hardware and software for retrieving records from the server system 100, for example, from the storage 140. The storage manager 135 may be able to retrieve records in response to a request that may include a key and a time value. For example, the storage manager 135 may receive a request from a user, for example, who is associated with a given tenant of the server system 100, to retrieve records. The request may include a key and a time value. The storage manager 135 may be able to retrieve appropriate versions of records from the record versions 160 that are responsive to the request, for example if the transaction numbers include or are a time value or approximate time value as disclosed herein. The storage manager 135 may be able to determine which of the record versions 160 in the storage 140 include a key that matches the key from the received request and a transaction number that is lower than or equal to, or from the same time or earlier in time than, the time value of the request. In some implementations, the record versions 160 may be immutable records. The storage manager 135 may be able to determine which of the record versions 160, that may be otherwise responsive request, would have been the current record at the time indicated by the time value of the request from among a group of records with identical keys. For example, the responsive version of a record, or transaction, from a group of version of records with identical keys may be the version of the record from the group with the highest transaction number that is not higher than the time value of the request. The storage manager 135 may be able to send the responsive versions of records from the record versions 160 to the party, for example, tenant, that submitted the request.

For example, the storage manager 135 may receive a request from a user, for example, who is associated with a given tenant of the server system 100, to retrieve records. The request may be for an uncommitted transaction (e.g., one or more of uncommitted transactions 145, such as transactions 146, 147, 148, and/or 149). In some implementations, the storage manager 135, in communication with the transaction number manager 130, may use a new transaction counter number (e.g., for an uncommitted transaction) as a new MVCC snapshot when a request is received. This is described above in connection with FIGS. 1 and 2, as well as in connection with the example operations discussed below.

The log manager 138 may be suitable combination of hardware and software on the server system 100 for logging insertions of one or more records in a record chain of transactions. A transaction number, a primary key value, and/or a row value may be logged as part of a record. That is, the state of the records in the storage 140 may change as part of a transaction and/or the processing of a transaction, and the log manager may log the change to the records, including the insertion of records. As described below in connection with example operations, the log manager 138 may log a commit record to commit a transaction, and/or may log an abort transaction for a transaction that has been aborted.

The storage 140 may be any suitable combination of hardware and software for storing uncommitted transactions 145 and record versions 160 on the server system 100. The storage 140 may use any suitable combination of any suitable volatile and non-volatile physical storage mediums, including, for example, hard disk drives, solid state drives, optical media, flash memory, tape drives, registers, and random access memory. Data, such as the uncommitted transaction 145 and the record versions 160, may be stored in any suitable format, using any suitable filesystem or storage scheme or hierarchy. For example, the storage 140 may store data using a log structured merge (LSM) tree with multiple levels. Further, if the system 100 is a multitenant system, the storage may be organized into separate log structured merge trees for each instance of a database for a tenant. Alternatively, all records on a particular server or system may be stored within a single log structured merge tree, in which case unique tenant identifiers associated with versions of records may be used to distinguish between data for each tenant as disclosed herein. More recent transactions may be stored at the highest or top level of the tree and older transactions may be stored at lower levels of the tree. Alternatively, the most recent transaction or version for each record may be stored at the highest level of the tree and prior versions or prior transactions at lower levels of the tree.

The uncommitted transaction 145 may be transactions received from users of the server system 100, such as, for example, tenants, that have not yet been committed. Each of the transactions 146, 147, 148, and 149 of the uncommitted transactions 145 may include a header, which may include a transaction number as assigned by the transaction number manager 130. Alternatively, the header information for a transaction (e.g., value 155, 156, 157, and/or 158) may be included as part of the value (e.g., value 155, 156, 157, and/or 158).

Each of the transactions 146, 147, 148, and 149 of the uncommitted transactions 145 may include a key 151, 152, 153, and 154, and a value 155, 156, 157, and 158. The keys 151, 152, 153, and 154 may be identifiers for their respective records for the transactions 146, 147, 148, and 149, and for versions of records stored based on the committing of the transactions 146, 147, 148, and 149. The keys 151, 152, 153, and 154 may in any suitable form, such as, for example, an alphanumeric sequence. Portions of the keys 151, 152, 153, and 154 may be, for example a tenant identifier, which may uniquely identify the tenant who submitted the transaction, a table number and identification of a row, for example, when the value of record is the contents of a row, or table number, index number on the table, and an identification of indexed columns when the value is the identification of a row. The values 155, 156, 157, and 158 may be, for example, the contents of a row of a table of a relational database, an identification of a row in a table of a relational database, or any other suitable value, for their respective transactions 146, 147, 148, and 149.

The uncommitted transactions 145 may be transactions that have not yet been committed and stored as version of records with the record versions 160. A transaction that is one of the uncommitted transactions 145 may not appear in the live or production database for the tenant that submitted the transaction, as the transaction may not yet be stored as a version of a record.

The record versions 160 may be versions of records resulting from committing transactions from the uncommitted transactions 145. When an uncommitted transaction is committed, the transaction may be assigned or associated with a transaction number, and a version of a record may be stored in the record versions 160 with the key and value from the transaction. For example, when the transaction 146 is committed, a version of a record with the key 151 and the value 155 may be stored in the record versions 160 and may be associated with the transaction number assigned to the transaction 146 during the committing. Each of the record versions 161, 162, 163, 164, 165, 166, 167, and 168 may include respective keys 171, 172, 173, 174, 175, 176, 177, and 178, values 181, 182, 183, 184, 185, 186, 187, and 188, and be associated with respective transaction numbers 191, 192, 193, 194, 195, 196, 197, and 198, which may be based on the keys and values of, and transaction numbers assigned to, the transactions that were stored as the record versions 161, 162, 163, 164, 165, 166, 167, and 168 upon being committed. The transaction numbers may strictly increase (or strictly decrease) with each of the transactions as a particular transaction is committed.

In some implementations, a transaction such as the transaction 161 may include multiple keys, or a key range, indicating a change to the value of multiple records, and may include a value for each key included in the transaction. For example, a single transaction may include keys for some number of rows of a table in a tenant's database and a value for each of the number of rows. Committing an uncommitted transaction that includes more than one key may result in a version of a record being stored for each key included in the transaction. The transaction may be assigned one transaction number, and each version of record stored when the transaction is committed may receive the same transaction number. A single transaction may not include duplicate keys, preventing two versions of the same record from having the same transaction number. The transaction counter 110110 and/or the transaction number manager 130 may use the unique tenant identifier for the tenant that submitted the transaction to generate a key for each version of a record stored based on the transaction.

If the system 100 is for example a multitenant database, the record versions 160 may belong to any number of different tenants of the server system 100. For example, the record versions 161, 162, 164, and 168 may be versions of a record belonging to a first instance of a first tenant, while the record versions 163, 165, 166, and 167 may be versions of a record belonging to an instance of a second tenant. Access to records, and transactions stored as versions of records, may be controlled by the keys of the record versions 160. For example, each of the keys 171, 172, 174, and 178 may include a unique tenant identifier for the first tenant, and may only be accessible to the first tenant or users associated with the tenant, whose requests to access or retrieve records typically will include a key that includes or references the unique tenant identifier. This may prevent the second tenant from accessing the record versions 161, 162, 164, and 168, as the second tenant may not be able to submit a request for records that includes a key with the unique tenant identifier for the first tenant. However, even if the transactions are for different tenants, and the sequence of transactions keeps switching between transactions of different tenants, the transaction numbers may strictly increase (or strictly decrease) even though the committed transactions may be for different tenants.

The record versions 160 belonging to a tenant in the storage 140 of the server system 100 may be the data for a database for that tenant. For example, the record versions 161, 162, 164, and 168 may be versions of records of an instance of a live or production database for the first tenant. The most current versions of the record versions 161, 162, 164, and 168 and any non-current, superseded transactions stored as versions of records may allow the first tenant to view all or part of their database as it appeared at a previous time, when the superseded transactions are the current transactions. Similarly, the record versions 163, 165, 166, and 167 may be versions of records of a database for the second tenant. The storage 140 may include versions of records for databases for any number of tenants, although the record versions themselves may be stored together with no segregation by tenant in the file system, storage scheme or hierarchy used by storage 140 of the server system 100. In some implementations, the record versions 160 belonging to a tenant in the storage 140 of the server system 100 may include all of the records versions for the live or production database for the tenant in the larger server network of which the server system 100 is a part.

The server system 100 may be part of a larger server network, which may include other server systems or clusters of server systems, for example, in other physical locations such as at other pods or datacenters. Within the larger server network, the records belonging to a single tenant for a specific purpose, which form in essence the live or production database for that tenant, may reside on a single server system at a node in the network. Transactions for records belonging to the tenant, including copies of some or all of the tenant's live or production database, stored on any other server system within a larger server network may not be part of the tenant's live or production database, and may only be used for sandboxing, testing, training, analytics, backup, and redundant access, or local caching for faster read access at a distant location purposes and may not be considered the live or production databases for the tenant. Each server system or server cluster within the larger server network may have its own counter, and current counter number for the purpose of assigning identifiers for transaction numbers. Alternatively, the counter and count could be maintained in the storage area network or SAN for the server or server cluster.

The same counter, for example, the transaction counter 110, and counter number, on a server system, for example, the server system 100, may be used to assign transaction numbers to transactions being committed for all tenants that have live instances on the server system. This may ensure that transaction numbers associated with all of the versions of records committed by the server system are unique and constitute a strictly increasing or decreasing series in the order that the transactions were committed, both for all versions of records on the server system, and for all versions of records belonging to each tenant on the server system.

Figure 6:
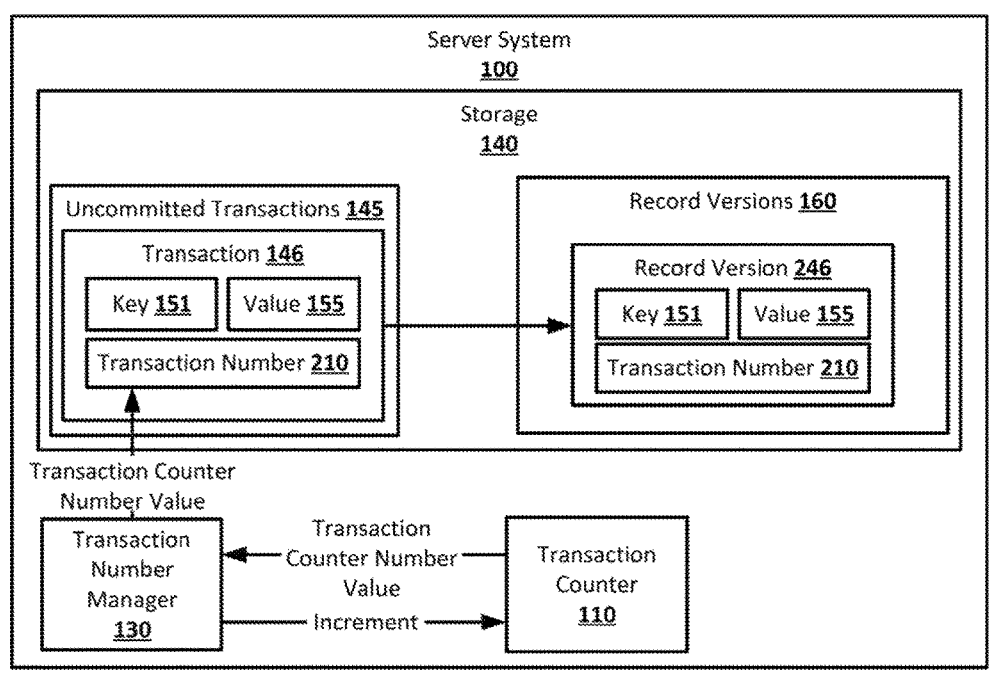
FIG. 6 shows an example arrangement suitable for transaction counter number assignment (i.e., "stamping") according to an implementation of the disclosed subject matter.

FIG. 6 shows an example arrangement suitable for transaction number assignment for an uncommitted transaction according to an implementation of the disclosed subject matter. In this example, the transaction 146 has been received by the server system 100, for example, from a tenant of the server system 100, and stored as one of the uncommitted transactions 145 in the storage 140. The example transaction 146 includes a key 151 and a value 155. The transaction 146 may be committed on the server system 100 based on any suitable event, such as, for example the elapsing of a period of time from when the transaction 146 was processed. Continuing with the example, the transaction number manager 130 receives the counter number value from the transaction counter 110, and assigns a transaction number 210 to the transaction 146 based on the counter number value. The transaction number manager 130 also may cause the transaction counter 110 to update the counter number value, for example, by causing the counter number value to increment. The record version 246 is then stored based on the transaction 146. The record version 246 may be stored with the record versions 160 in the storage 140, and may include the key 151 and the value 155 from the transaction 146 as previously disclosed herein, and may be associated with the transaction number 210 that was signed to the transaction 146. Once the record version 246 has been committed, the uncommitted transaction 146 may be removed or deleted from the uncommitted transactions 145.

Before the transaction 146 is committed on the server system 100, the header (e.g., the value 155) of the uncommitted transaction 146 may be updated with an assigned transaction counter number (e.g., by the transaction number manager 130). New queries received by the server system 100 may use this assigned transaction counter number as the MVCC snapshot. As discussed above, the transaction 146 may be in the process of being committed (i.e., "stamped") in a concurrent operation, and the server system 100 may be able to use the assigned transaction counter number as the snapshot.

Figure 7:
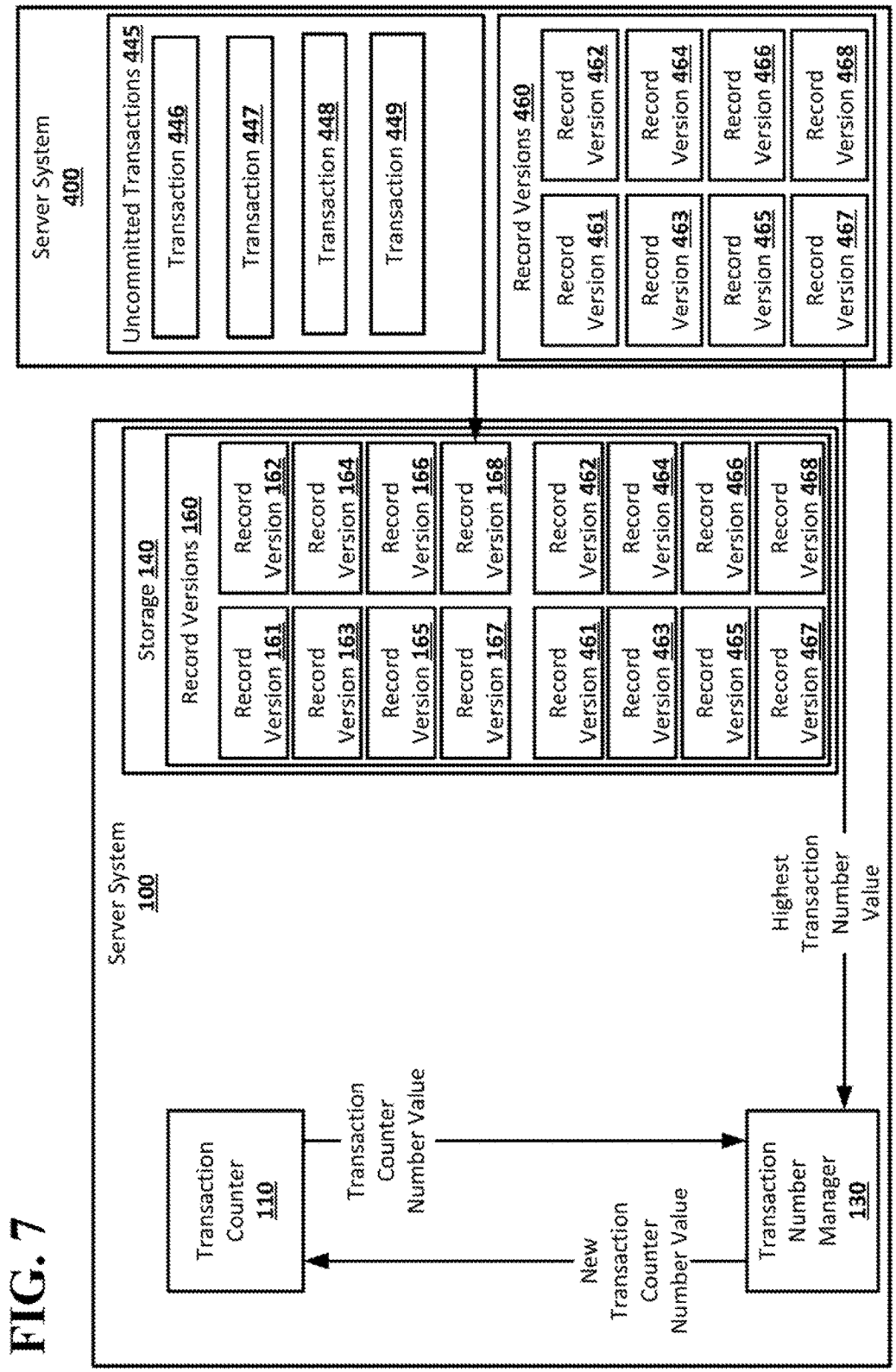
FIG. 7 shows an example arrangement suitable for transaction number assignment (i.e., "stamping") according to an implementation of the disclosed subject matter.

FIG. 7 shows an example arrangement suitable for transaction number assignment according to an implementation of the disclosed subject matter. The live or production database for a tenant may be migrated from one server system, cluster or data center to another within the larger server network. For example, all of the records and transactions, including current versions of the records and uncommitted transactions (e.g., that may have assigned transaction counter numbers that may be used as the MVCC snapshot), belonging to a tenant's production database within the larger server network may be stored on one server system, and may then be moved or migrated to another server system due to a variety of reasons, including maintenance, performance or server failure. As described in further detail herein, a server system from which the live or production database are migrated may be considered a "sending" server system, and a server system to which the live or production database is being migrated may be considered a "receiving" server system for which the records being moved may be migrated records.

When the live or production database is moved between systems, each transaction, or version of a record, being moved in implementations may be associated with a transaction number that was assigned using a counter of the sending server system along with a key. Thus, one or more of the versions of records being moved may be assigned a transaction number that is higher than the value of the counter number of the counter of the receiving server system, and also higher than any transaction number associated with a version of a record already stored on the receiving server system. This may occur for a number of reasons, such as, the number of transactions that have been assigned at the sending or receiving systems or if the transaction identifier includes a time value, for example, differing resynchronization periods, differing volumes of received and committed transactions, clock drifts, or the like.

The server system 100 may receive record versions of the records 460, which may have already been assigned transaction numbers by the sending server system 400. The server system 100 may be a receiving server system and the server system 400 may be a sending server system for the record versions 460. The record versions from the record versions 460 may be, for example, all of the record versions on the server system 400 for records belonging to an instance of a tenant of the server system 400. There may be no record versions in the record versions 160 on the server system 100 for an instance of records belonging to that tenant before the migration of the record versions from the records 460.

Some or all of the record versions 460, such as record versions 461, 462, 463, 464, 465, 466, 467, and 468, for the records being migrated may be sent by the server system 400 and stored in a storage 140 of the server system 100. Each of the record versions 461, 462, 463, 464, 465, 466, 467, and 468 may be a committed transaction and may have its own key, value, and associated transaction number. The transaction numbers of the transactions 461 through 468 may also have been unique and assigned strictly increasingly or decreasingly in the sequence that the transactions were committed at server 400.

Some or all of the uncommitted transactions 445, such as transactions, 446, 447, 448, and/or 449 for the records being migrated may be sent by the server system 400 and stored in a storage 140 of the server system 100 (not shown). For example, such uncommitted transactions being migrated may be stored in the uncommitted transactions 145 section of the storage 140 shown in FIG. 5. One or more of the uncommitted transactions 446, 447, 448, and 449 may be a transaction that is in the process of being committed, and may have its own key, value, and associated transaction number.

Further, the transaction numbers for all of the server systems at all of the nodes in the in the network may assign unique transaction numbers (e.g., numbers that are strictly increasing or decreasing). Further, the transaction numbers being assigned may be unique and strictly increasing for all servers or may be unique and strictly decreasing for all servers. In some implementations, transaction numbers may be non-unique between record versions, such as where one transaction results in multiple versions of one or more records. The last transaction number associated with any of the record versions 461, 462, 463, 464, 465, 466, 467, and 468 being sent to the server system 100 may be determined. This last transaction number may be determined by the server system 400 before or during sending of the records, or may be determined by the server system 100, for example, with the transaction number manager 130, during or after receiving of the records and transactions being migrated. Alternatively, or in addition, the last transaction number may be associated with an uncommitted transaction 445 (e.g., transactions 446, 447, 448, and/or 449) of the server system 400, which may be in the process of being committed so as to become part of the records versions 460, or which may be migrated over to storage 140 to be stored in the uncommitted transactions 145. That is the last transaction number of an uncommitted transaction (e.g., transactions 446, 447, 448, and/or 449) may be used as the MVCC snapshot.

Continuing the example above using the record versions 460, and assuming both server systems 100 and 400 used the same transaction number schema of assigning unique (for the server system) transaction numbers in a strictly increasing sequence, the transaction number manager 130 may compare the value of the highest transaction number associated with any of the record versions 461, 462, 463, 464, 465, 466, 467, and 468 with the counter number value of the transaction counter 110 and/or the highest transaction number associated with the uncommitted transactions 445 (e.g., transactions 446, 447, 448, and/or 449). If the highest transaction number associated with any of the record versions 461, 462, 463, 464, 465, 466, 467, and 468 for the migrated records is higher, or further ahead in time, then the counter number value and/or the highest transaction number associated with the uncommitted transactions 445 (e.g., transactions 446, 447, 448, and/or 449), the transaction number manager 130 may cause the transaction counter 110 to set the counter number value to be higher than the value of the highest transaction number associated with any of the migrated records. Otherwise, the counter number value may stay the same. This may ensure the strict increasing or decreasing of the transaction numbers associated with transactions stored in the storage 140 of server system 100, as the next committed transaction on the server system 100 may be assigned a transaction number that is higher, or further ahead in time, then the highest transaction number associated with any record version of the record versions 160, including the migrated records 461, 462, 463, 464, 465, 466, 467, and 468.

Alternatively, the transaction number manager 130 may compare the value of the highest transaction number associated with any of the uncommitted transactions 446, 447, 448, and 449 (e.g., that may be in the process of being committed to the records version 460) with the counter number value of the transaction counter 110. If the highest transaction number associated with any of the uncommitted transactions 445 for the migrated records is higher, or further ahead in time, then the counter number value and/or the highest transaction number associated with any of the record versions 460, the transaction number manager 130 may cause the transaction counter 110 to set the counter number value to be higher than the value of the highest transaction number associated with any of the migrated records. Otherwise, the counter number value may stay the same. This may ensure the strict increasing or decreasing of the transaction numbers associated with transactions stored in the storage 140 of server system 100, as the next committed transaction on the server system 100 may be assigned a transaction number that is higher, or further ahead in time, then the highest transaction number associated with any record version of the record versions 160, including the migrated records 461, 462, 463, 464, 465, 466, 467, and 468.

Alternative ways to maintain the strict increasing or decreasing for any live or production database are also possible. The time interval to migrate a production database from a first server cluster to a second server cluster is likely to be far less than the relative skew between the vast majority of server clusters or pods. Hence, in most instances, merely including the local server's time as a portion of the transaction number should be enough to ensure the strict increasing or decreasing with a counter counting transactions between the increments of the clock for the receiving server system and the migrated database.

Figure 8A:
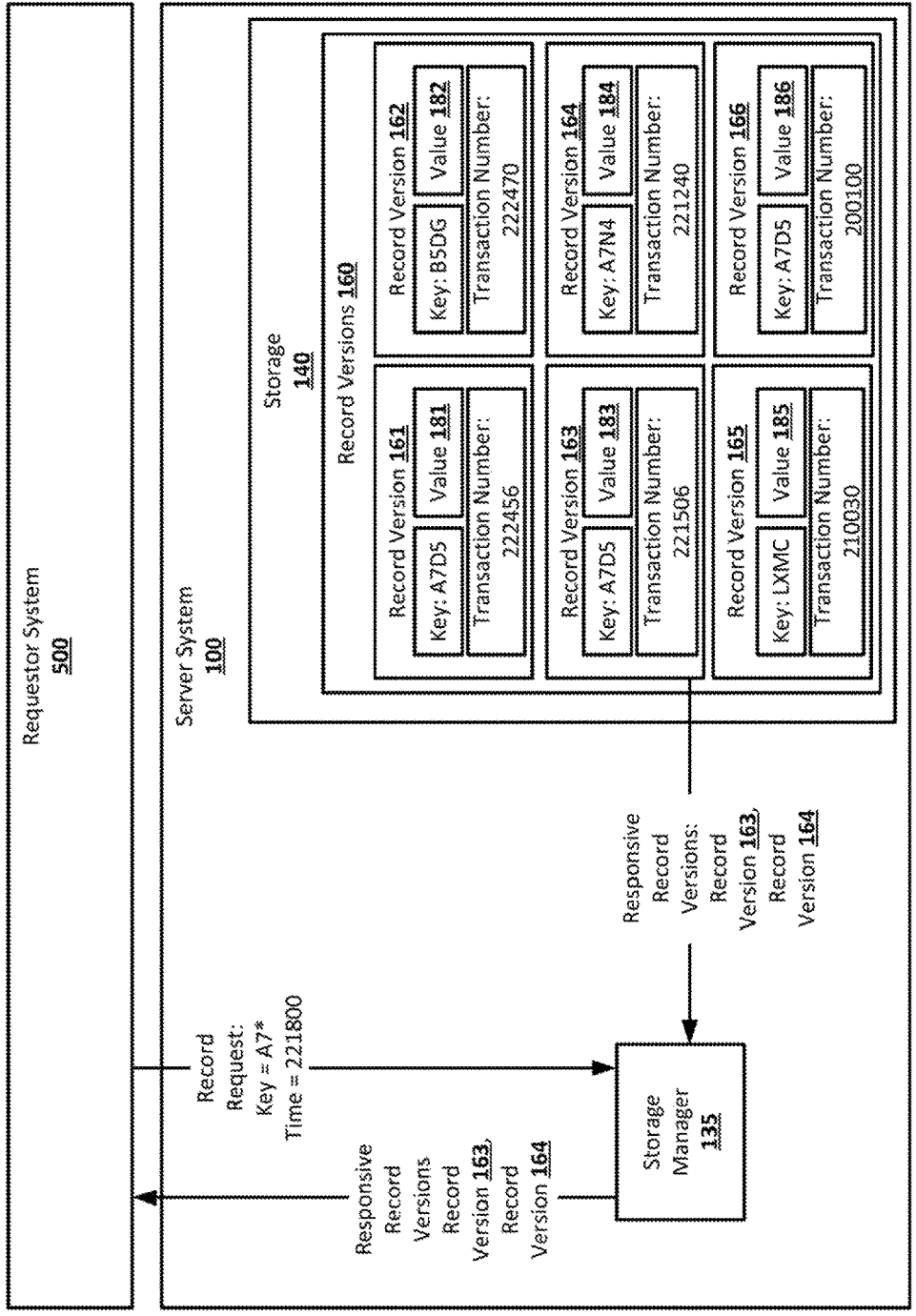
FIGS. 8A and 8B show an example arrangement suitable for transaction number assignment (i.e., "stamping") according to an implementation of the disclosed subject matter.

FIG. 8A shows an example arrangement suitable for transaction number assignment according to an implementation of the disclosed subject matter. A request for some of the records with record versions in the record versions 160 in the storage 140 may be received by the server system 100 from a requestor system 500. The requestor system 500 may be, for example, any suitable computing device used by a user associated with a tenant of the server system 100. The request may be for records belonging to the tenant which the tenant wishes to view, for example, individually, as part of a table, a whole table, or tables, from the tenant's database on the server system 100. Alternatively, the user may wish to obtain a copy of the entire database.

The request from the requestor system 500 may include a key and a time value. For example, the request may include the key "A7*", where "A7" is a unique tenant identifier for the tenant using the requestor system 500 and the wildcard may indicate that the request is for all records with a key that includes that unique tenant identifier, regardless of the rest of the key. The time value of the request may be 221800. This may indicate that the tenant wishes to retrieve all of the record versions from the record versions 160 that belong to the tenant that were current as of the time indicated by the time value of 221800.

The storage manager 135 may receive the request from the requestor system 500 and determine which of the record versions 161, 162, 163, 164, 165, and 166 are responsive to the request. Responsive record versions may be record versions which match the key value of the request of A7*, and may also be associated with a transaction number that is higher than any other transaction number associated with another record version with the same key, of the same record, while still being lower than or equal to the time value of the request. A record version may match the key value and not be responsive due to its associated transaction number (if for example, the transaction occurred after the time value or the transaction number of the request), or may be associated with an appropriate transaction number, but not be responsive due to not matching the key value. For example, the record versions 161, 163, 164, and 166 may match the key value of the request of A7*, with respective key values of A7D5, A7D5, A7N4, and A7D5. The record version 161 may not be a responsive record for the request, for example, as the transaction number associated with the record version 161 of 22456 is higher than the time value of the request of 221800, indicating that the transaction of the record version 161 was stored after the time indicated by the time value of the request. As another example, the record version 166 may have the an identical key to the record version 163, as they may be stored transactions for the same record, and the record version 163 may be associated with a transaction number of 221506, which may be lower than the time value of the request of 221800 and higher than the transaction number associated with the record version 166 of 200100. This may indicate that the record version 163 was the current record version for the record at the time indicated by the time value of the request 221800, having superseded the record version 166 for that record. Thus, the record version 166 is not a responsive record version for the example request. The record versions 163 and 164 may be responsive to the request from the requestor system 500. The storage manager 135 may send the responsive records 163 and 164 to the requestor system 500, where they may be used in any suitable manner, such as, for example, to display tables from the tenant's database.

Figure 8B:
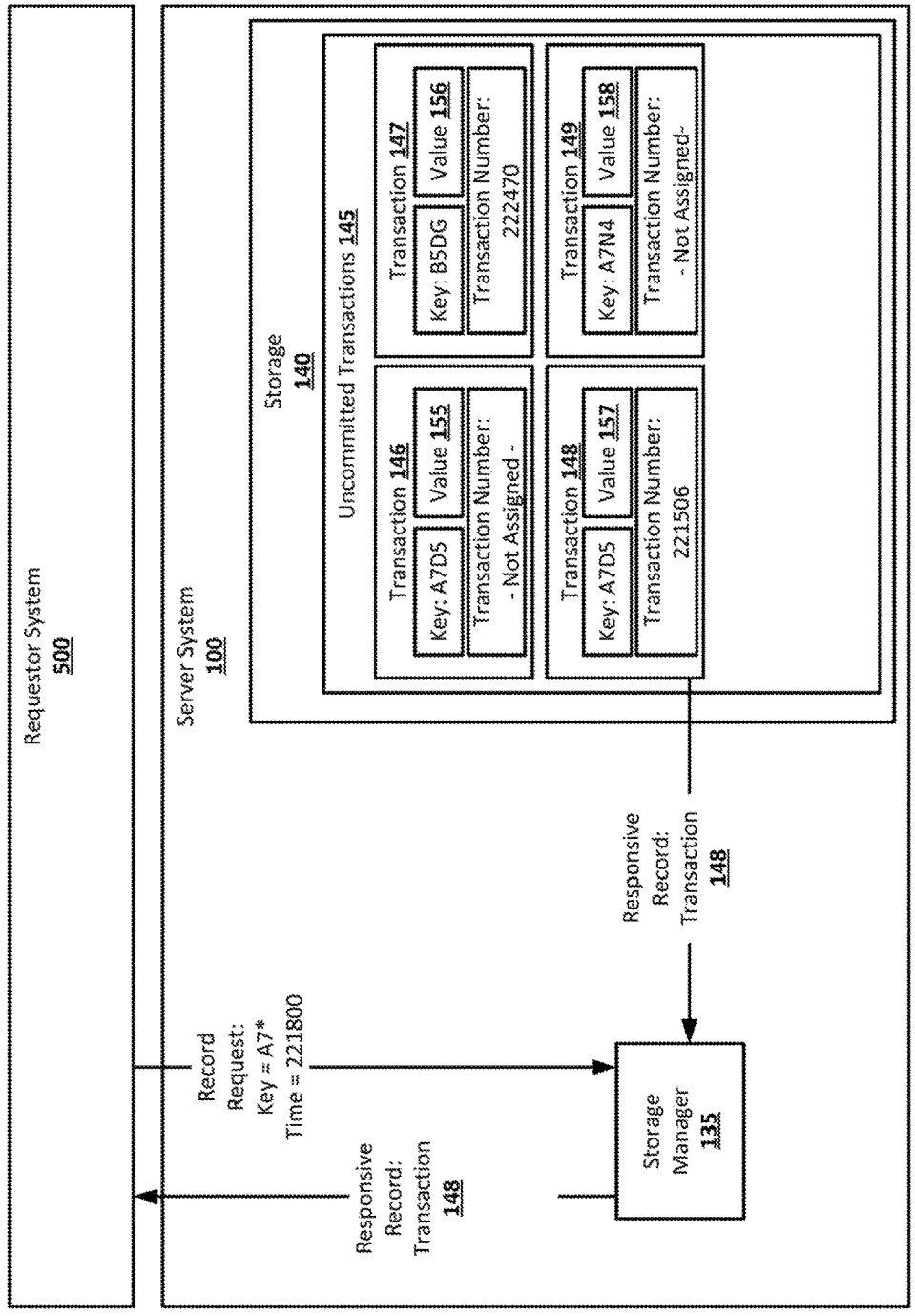

FIG. 8B shows an example arrangement suitable for transaction number assignment according to an implementation of the disclosed subject matter. A request for some of the records which may be uncommitted transactions (e.g., a transaction 146, 147, 148, and/or 149 or uncommitted transactions 145) in the storage 140 may be received by the server system 100 from a requestor system 500. That is, uncommitted transaction may not be typically visible to the requestor system 500, but may be visible, at least in part, when the uncommitted transactions have a transaction number assigned to them, and are in the process of being committed.

The request from the requestor system 500 may include a key and a time value. For example, the request may include the key "A7*", where "A7" is a unique tenant identifier for the tenant using the requestor system 500 and the wildcard may indicate that the request is for all records with a key that includes that unique tenant identifier, regardless of the rest of the key. The time value of the request may be 221800. This may indicate that the tenant wishes to retrieve all of the record versions (e.g., as shown in FIG. 8A) and/or uncommitted transactions 145 that have transaction numbers assigned but have not yet been committed that belong to the tenant that were current as of the time indicated by the time value of 221800.

The storage manager 135 may receive the request from the requestor system 500 and determine which of the uncommitted transactions 146, 147, 148, and/or 149 are responsive to the request. Responsive uncommitted transactions may be record versions which match the key value of the request of A7*, and may also be associated with a transaction number that is higher than any other transaction number associated with another record version with the same key, of the same record, while still being lower than or equal to the time value of the request. Uncommitted transactions that do not yet have a transaction number assigned may not be considered (e.g., transactions 146 and 149). A transaction of the uncommitted transactions may match the key value and not be responsive due to its associated transaction number or lack of an associated transaction number (if for example, the transaction occurred after the time value or the transaction number of the request), or may be associated with an appropriate transaction number, but not be responsive due to not matching the key value. For example, the transactions 146, 148, and 149 may match the key value of the request of A7*, with respective key values of A7D5, A7D5, and A7N4. The transaction 146 may not be a responsive record for the request, for example, as there is no transaction number associated with the transaction 146. The transaction 148 may be responsive to the request from the requestor system 500. The storage manager 135 may send the transaction to the requestor system 500, where they may be used in any suitable manner, such as, for example, to display tables from the tenant's database.

Figure 9:
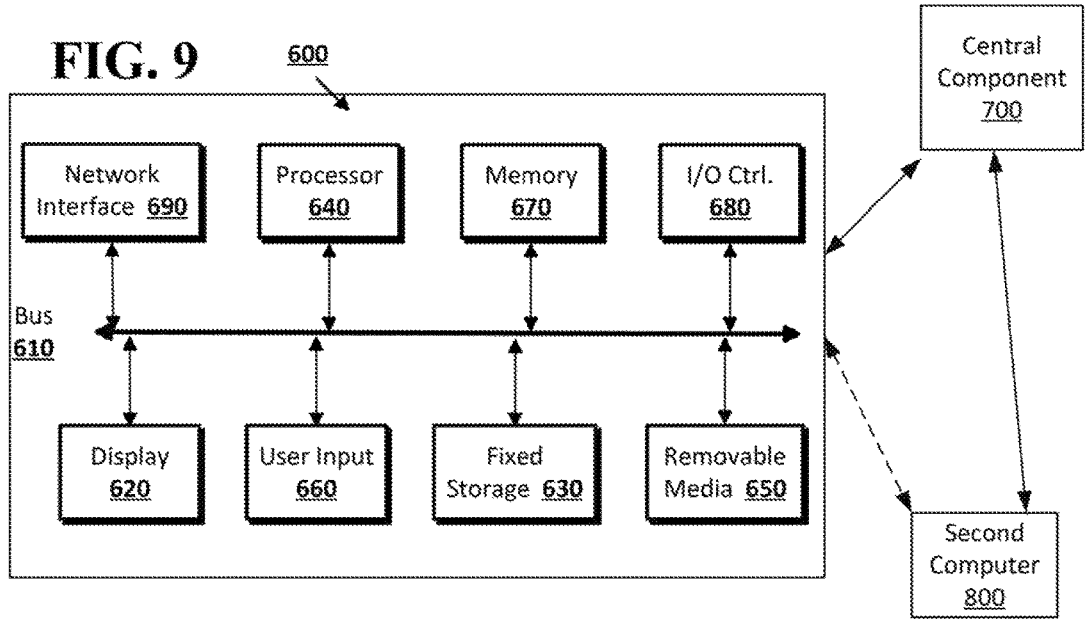
FIG. 9 shows a computer according to an implementation of the disclosed subject matter.

Implementations of the presently disclosed subject matter may be implemented in and used with a variety of component and network architectures. FIG. 9 is an example computer 600 suitable for implementing implementations of the presently disclosed subject matter. As discussed in further detail herein, the computer 600 may be a single computer in a network of multiple computers. As shown in FIG. 9, the computer 600 may communicate a central component 700 (e.g., server, cloud server, database, etc.). The central component 700 may communicate with one or more other computers such as the second computer 800. According to this implementation, the information obtained to and/or from a central component 700 may be isolated for each computer such that computer 600 may not share information with computer 800. Alternatively or in addition, computer 600 may communicate directly with the second computer 800.

The computer (e.g., user computer, enterprise computer, etc.) 600 includes a bus 610 which interconnects major components of the computer 600, such as a central processor 640, a memory 670 (typically RAM, but which may also include ROM, flash RAM, or the like), an input/output controller 680, a user display 620, such as a display or touch screen via a display adapter, a user input interface 660, which may include one or more controllers and associated user input or devices such as a keyboard, mouse, WiFi/cellular radios, touchscreen, microphone/speakers and the like, and may be closely coupled to the I/O controller 680, fixed storage 630, such as a hard drive, flash storage, Fibre Channel network, SAN device, SCSI device, and the like, and a removable media component 650 operative to control and receive an optical disk, flash drive, and the like.

The bus 610 enable data communication between the central processor 640 and the memory 670, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 600 can be stored on and accessed via a computer readable medium, such as a hard disk drive (e.g., fixed storage 630), an optical drive, floppy disk, or other storage medium 650.

Figure 10:
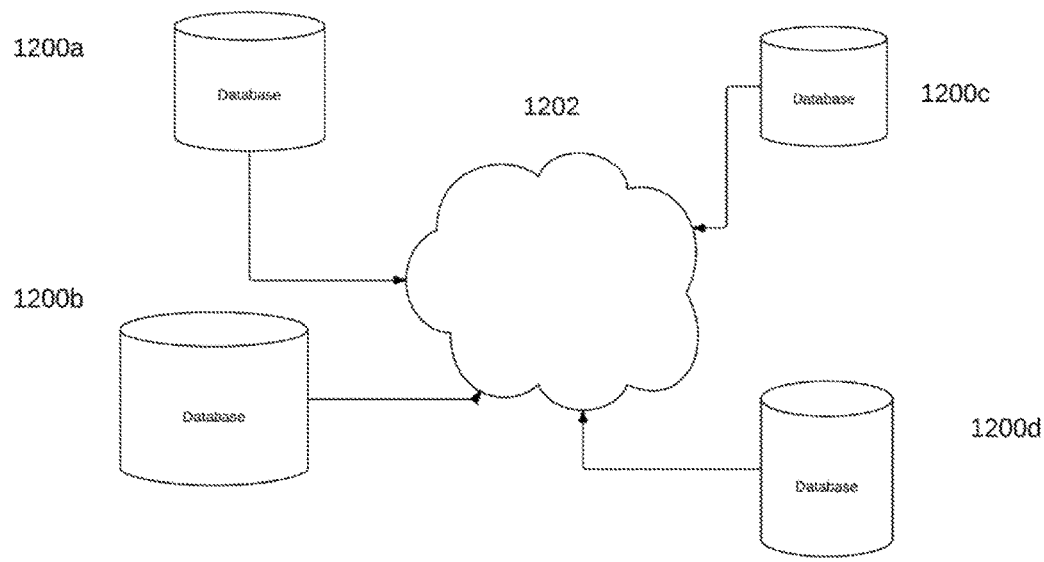
FIG. 10 shows a network configuration according to an implementation of the disclosed subject matter.

The fixed storage 630 may be integral with the computer 600 or may be separate and accessed through other interfaces. A network interface 690 may provide a direct connection to a remote server via a telephone link, to the Internet via an internet service provider (ISP), or a direct connection to a remote server via a direct network link to the Internet via a POP (point of presence) or other technique. The network interface 690 may provide such connection using wireless techniques, including digital cellular telephone connection, Cellular Digital Packet Data (CDPD) connection, digital satellite data connection or the like. For example, the network interface 690 may enable the computer to communicate with other computers via one or more local, wide-area, or other networks, as shown in FIG. 10.

Many other devices or components (not shown) may be connected in a similar manner (e.g., document scanners, digital cameras and so on). Conversely, all of the components shown in FIG. 10 need not be present to practice the present disclosure. The components can be interconnected in different ways from that shown. The operation of a computer such as that shown in FIG. 10 is readily known in the art and is not discussed in detail in this application. Code to implement the present disclosure can be stored in computer-readable storage media such as one or more of the memory 670, fixed storage 630, removable media 650, or on a remote storage location.

and subtransactions based on knowledge of a transaction number and the storage 140 transaction sequence number returned by storage 140 get location operation.

In a first example, there are three transaction histories (i.e., transaction 1, transaction 2, and transaction 3, where the transactions may be top-level transactions) shown in the table 1A below, where x is an integer value).

TABLE 1A

| | Transaction 1 (transaction number = 101; snapshot transaction counter number is 1) | Transaction 2 (transaction number = 102; snapshot transaction counter number is 1) | Transaction 3 (transaction number = 103; snapshot transaction counter number is 1) |
|---|---|---|---|
| 1 | Begin | Begin | Begin |
| 2 | Update table, set X = x + 100 | | |
| 3 | Savepoint S1 | | |
| 4 | Update table, set x = x + 666; primary key is 1 | | |
| 5 | | Update table, set x = 2; primary key is 1 | |
| 6 | Rollback to S1 | | |
| 7 | | | Update table, set x = 3; primary key is 1 |
| 8 | Rollback | | |
| 9 | | Commit | |
| 10 | | | Commit |

FIG. 10 shows an example network arrangement according to an implementation of the disclosed subject matter. Four separate database systems 1200a-d at different nodes in the network represented by cloud 1202 communicate with each other through networking links 1204 and with users (not shown). Each of database systems 1200 may be operable to host multiple instances of a multitenant database such as Postgress, Mysql Server or Oracle 12c running a Linux operating system and a Hadoop framework where each instance is accessible only to users associated with a particular tenant. Each of the database systems may constitute a cluster of computers along with a storage area network (not shown), load balancers and backup servers along with firewalls, other security systems, and authentication systems. Some of the instances at any of systems 1200 may be live or production instances processing and committing transactions received from users or from computing elements (not shown) for ingesting and providing data for storage in the instances. Each of database systems may use a system such as described in FIGS. 5-9 for assigning transaction numbers to each of the transactions being committed in the order that the sequences are being committed.

Using one or more of the implementations discussed above, the following examples may show the operation of the server system in processing (uncommitted) transactions, and may show example operations of data structures, a lock manager 125, transaction number manager 130, and the storage manager 135, and the log manager 138 are described below.

In the examples, values are selected so as to show the transaction number and transaction sequence number pairs used as rollback targets for statement boundaries and savepoints. In the examples, implementations using a storage 140 begin transaction operation and a storage 140 begin subtransaction may be used. In some implementations, these operations may not be used, and the transaction number manager 130 may create values representing log structured merge (LSM) transaction numbers for top-level transactions As shown in line 1 in the table 1A above, the three top-level transactions 1, 2 and 3 are created. The transaction number manager 130 may assign a transaction number (e.g., transactions numbers 101, 102 and 103, respectively, in this example), may create the transaction context and may communicate with the storage 140 so as register that there's now an active transaction having the assigned transaction number. A log-structured merge (LSM) transaction number value with the transaction sequence number of the beginning of the transaction (i.e., sequence number zero) and the LSM transaction number is associated with and/or stored with the transaction context. The transaction number manager may acquire exclusive locks in the lock manager 125 having lock tags for each or the transactions (i.e., locks for transactions 101, 102, and 103). No log records (e.g., that may be managed and/or generated by the log manager 138) may be generated by any of these operations.

The state of the lock manager 125 for line 1 of table 1A is shown in table 1B below:

TABLE 1B

| | |
|---|---|
| Locktag transaction (101) | Exclusive lock by transaction number 101 |
| Locktag transaction (102) | Exclusive lock by transaction number 102 |
| Locktag transaction (103) | Exclusive lock by transaction number 103 |

The status of the transaction number manager 130 (i.e., the state of context stacks within the transaction number manager) for line 1 of table 1A is shown in the table 1C below:

TABLE 1C

| |
|---|
| Transaction 1: empty -> (101, 0) |
| Transaction 2: empty -> (102, 0) |
| Transaction 3: empty -> (103, 0) |

The state of the log manager 138 for line 1 of the table 1A is shown in table 1D below:

TABLE 1D

| No Output |
| --- |

The state for the transactions for line 1 of table 1A is shown in the table 1E below:

TABLE 1E

| Transaction 1 | ID = 101 | newest sequence number = 0 |
| --- | --- | --- |
| Transaction 2 | ID = 102 | newest sequence number = 0 |
| Transaction 3 | ID = 103 | newest sequence number = 0 |

The state for the primary key in the storage 140 for line 1 of table 1A is shown in table 1F below:

TABLE 1F

| Primary key is 1 (p = 1) | Row version record (transaction counter number = 1, p = 1, and x = 1) |
| --- | --- |
| Primary key is 2 (p = 2) | Row version record (transaction counter number = 1, p = 2, and x = 2) |

As shown in line 2 of the table 1A above, transaction 1 may start a new subtransaction for processing its first command identification statement (cid), where cid=1. The transaction number manager 130 may obtain a new LSM transaction number value for the subtransaction. The status of the transaction 1 may be (101, 0), since no records have been added to the storage 140 for transaction number 101 yet. The subtransaction context may be pushed onto a context stack managed by the transaction number manager 130 for transaction number 101. To process the update, a scan may be conducted over the rows of the table 1A where the snapshot transaction counter number is one (1). As each row is returned, a computation may be performed on the content of the column x, and an appropriate row version record may be created in the storage 140 by calling an insert record operation for the primary key of each updated row. Each inserted record may be assigned a monotonically increasing transaction sequence number representing its position within the per-transaction record chain for the transaction number 101. Each insertion may be logged by the log manager 138. The updates may not affect the value of the primary keys, so the inserts may have a lock mode which indicated that there is no key update. The insertions may not conflict with any existing uncommitted data for the keys, so the implicit row lock requests may be granted (e.g., the requests may be immediately granted). The updates may not create snapshot violations, since snapshot having transaction counter number of one (1) is less than or equal to the transaction counter number stamped on the committed row version record for a primary key value of 1 and a primary key value of 2. Each row version record insertion and the associated state examination may occur under the key bucket latch for the corresponding primary key. When an update operation is complete, the transaction number manager 130 may retrieve the subtransaction context for the statement.

The status of the lock manager 125 for line 2 of table 1A is shown in table 2A below:

TABLE 2A

| Locktag transaction (101) | Exclusive lock by transaction number 101 |
| --- | --- |
| Locktag transaction (102) | Exclusive lock by transaction number 102 |
| Locktag transaction (103) | Exclusive lock by transaction number 103 |

The status of the transaction number manager 130 (i.e., the state of the context stacks) for line 2 of table 1A is shown in the table 2B below:

TABLE 2B

| Transaction 1: (101, 0) -> (101, 0), (101, 0) -> (101, 0) |
| --- |
| Transaction 2: (102, 0) |
| Transaction 3: (103, 0) |

The state of the log manager 138 for line 2 of the table 1A is shown in table 2C below:

TABLE 2C

| Insert | LSM transaction number = (101, 0), primary key is 1 (p = 1), x = 101 |
| --- | --- |
| Insert | LSM transaction number = (101, 0), primary key is 2 (p = 2), x = 102 |

The state for the transactions for line 2 of table 1A is shown in the table 2D below:

TABLE 2D

| Transaction 1 | ID = 101 | newest sequence number = 2 |
| --- | --- | --- |
| Transaction 2 | ID = 102 | newest sequence number = 0 |
| Transaction 3 | ID = 103 | newest sequence number = 0 |

The state for the primary key for line 2 of table 1A is shown in table 2E below:

TABLE 2E

| Primary key is 1 (p = 1) | Row version record (LSM transaction number = (101, 0), sequence number = 1, lock mode = no key update, granted = true, cid = 1, p = 1, and x = 101), Row version record (transaction counter number = 1, p = 1, x = 1) |
| --- | --- |
| Primary key is 2 (p = 2) | Row version record (LSM transaction number = (101, 0), sequence number = 2, lock mode = no key update, granted = true, cid = 1, p = 2, and x = 102), Row version record (transaction counter number = 1, p = 2, x = 2) |

As shown in line 3 of the table 1A above, transaction 1 may define a savepoint named s1 by calling an operation to begin a subtransaction so as to receive an LSM transaction number of (101, 2) for the subtransaction. The transaction number manager 130 may push the new subtransaction context onto the context stack of the transaction number manager 130 for transaction 1. The state of the storage 140 may not change, and no values may be logged by the log manager 138.

The state of the lock manager 125 for line 3 of table 1A is shown in table 3A below:

TABLE 3A

| Locktag transaction (101) | Exclusive lock by transaction number 101 |
| --- | --- |
| Locktag transaction (102) | Exclusive lock by transaction number 102 |
| Locktag transaction (103) | Exclusive lock by transaction number 103 |

The state of the transaction number manager 130 (i.e., state of the context stacks) for line 3 of table 1A is shown in the table 3B below:

TABLE 3B

Transaction 1: (101, 0) -> (101, 0), (101, 2)
Transaction 2: (102, 0)
Transaction 3: (103, 0)

The state of the log manager 138 for line 3 of the table 1A is shown in table 3C below:

TABLE 3C

| Insert | LSM transaction number = (101, 0), primary key is 1 (p = 1), x = 101 |
| Insert | LSM transaction number = (101, 0), primary key is 2 (p = 2), x = 102 |

The state for the transactions for line 3 of table 1A is shown in the table 3D below:

TABLE 3D

| Transaction 1 | ID = 101 | newest sequence number = 2 |
| Transaction 2 | ID = 102 | newest sequence number = 0 |
| Transaction 3 | ID = 103 | newest sequence number = 0 |

The state for the primary key for line 1 of table 1A is shown in table 3E below:

TABLE 3E

| Primary key is 1 (p = 1) | Row version record (LSM transaction number = (101, 0), sequence number = 1, lock mode = no key update, granted = true, cid = 1, p = 1, and x = 101), Row version record (transaction counter number = 1, p = 1, x = 1) |
| Primary key is 2 (p = 2) | Row version record (LSM transaction number = (101, 0), sequence number = 2, lock mode = no key update, granted = true, cid = 1, p = 2, and x = 102), Row version record (transaction counter number = 1, p = 2, x = 2) |

As shown in line 4, the transaction 1 may start a new subtransaction for processing its second command identification statement (cid=2). The transaction number manager 130 performs an operation to begin a subtransaction, and obtains the LSM transaction number for the subtransaction (i.e., (101, 2)). This subtransaction context may be pushed onto the context stack of the transaction number manager 130 for the transaction number 101. To process the update, an operation is performed to open a scan over the rows of table for a transaction number 101 and snapshot transaction number of 1, with a scan key that will return rows having a primary key of 1. A row version record may be returned which is uncommitted, and has a transaction number of 101 and command identification statement of 1 (cid=1). The transaction (i.e., transaction 1) may be visible (i.e., visible to a query), since the transaction 1's command identification statement (i.e., cid=1) is less than the current command identification statement (i.e., cid=2). The new value of x may be computed as 101+666=767, and an insert record operation may be performed to record the new row version in the storage 140. The primary key may not change, so the insert occurs with the lock mode where there is no key update. There is no conflict with the existing implicit "no key update" mode row lock for when the primary key is 1, since the row version record's transaction counter number is 101. The transactions do not conflict with themselves, and there is no snapshot violation. The insert may be logged by the log manager 138. Once the update operation is complete, the transaction number manager 130 may retrieve the subtransaction context for the statement.

The status of the lock manager 125 for line 4 of table 1A is shown in table 4A below:

TABLE 4A

| Locktag transaction (101) | Exclusive lock by transaction number 101 |
| Locktag transaction (102) | Exclusive lock by transaction number 102 |
| Locktag transaction (103) | Exclusive lock by transaction number 103 |

The status of the transaction number manager 130 (i.e., status of the context stacks) for line 4 of table 1A is shown in the table 4B below:

TABLE 4B

Transaction 1: (101, 0), (101, 2) -> (101, 0), (101, 2), (101, 2) -> (101, 0), (101, 2)
Transaction 2: (102, 0)
Transaction 3: (103, 0)

The state of the log manager 138 for line 4 of the table 1A is shown in table 4C below:

TABLE 4C

| Insert | LSM transaction number = (101, 0), primary key is 1 (p = 1), x = 101 |
| Insert | LSM transaction number = (101, 0), primary key is 2 (p = 2), x = 102 |
| Insert | LSM transaction number = (101, 2), primary key is 1 (p = 1), x = 767 |

The state for the transactions for line 4 of table 1A is shown in the table 4D below:

TABLE 4D

| Transaction 1 | ID = 101 | newest sequence number = 3 |
| Transaction 2 | ID = 102 | newest sequence number = 0 |
| Transaction 3 | ID = 103 | newest sequence number = 0 |

The state for the primary key for line 4 of table 1A is shown in table 4E below:

TABLE 4E

| Primary key is 1 (p = 1) | Row version record (LSM transaction number = (101, 2), sequence number = 3, lock mode = no key update, granted = true, cid = 2, p = 1, and x = 767), Row version record (LSM transaction number = (101, 2), sequence number = 1, lock mode = no key update, granted = true, cid = 1, p = 1, and x = 101), Row version record (transaction counter number = 1, p = 1, x = 1) |
| Primary key is 2 (p = 2) | Row version record (LSM transaction number = (101, 0), sequence number = 2, lock mode = no key update, granted = true, cid = 1, p = 2, and x = 102), Row version record (transaction counter number = 1, p = 2, x = 2) |

As shown in line 5 of the table 1A above, the transaction may begin a new subtransaction for processing its first statement having a command identification statement of 1 (cid=1). The transaction number manager 130 may perform an operation to being the subtransaction, and may obtain the LSM transaction number for the subtransaction (i.e., (102, 0)), and this subtransaction context may be pushed onto the context stack of the transaction number manager 130 for the transaction number 102. An operation may be performed to scan over the rows of table for the transaction number 102 and the snapshot transaction counter number 1 with a scan key that will return rows having the primary key of 1. A row version record may be returned, which is a committed version of a transaction having a transaction counter number of 1. This may be visible to transaction 2, since the transaction counter number is 1, which is less than or equal to transaction 2's snapshot transaction counter number, while the uncommitted row version record from transaction 1 is not. Transaction 2 may proceed to process the update by recording a new version of the row having x=2. The lock mode may be no key update, but, in contrast to the rows of the table 1A discussed above, there may be a conflict with the implicit no key update row lock held by the transaction 1. A row version record for the update may be created in the storage 140 while holding the key bucket latch for where the primary key is 1, but a flag may be set to false (i.e., granted flag=false) to indicate that this update is pending lock acquisition. For the current row lock state for the primary key of 1, it may be determined that transaction 2 is blocked by transaction 1 (where the transaction number is=101) and transaction 2 waits for transaction 1 to finish, or explicitly release its row lock on the primary key of 1. Transaction 2 may be blocked when attempting to acquire the locktag transaction lock (101) in shared mode. Transaction 1 may still be active, and the transaction number manager 130 may maintain an exclusive lock on the locktag transaction (101), so the shared lock request may sleep.

The state of the lock manager 125 for line 5 of table 1A is shown in table 5A below:

TABLE 5A

| | |
|---|---|
| Locktag transaction (101) | Exclusive lock by transaction number 101; transaction number 102 waiting for shared lock |
| Locktag transaction (102) | Exclusive lock by transaction number 102 |
| Locktag transaction (103) | Exclusive lock by transaction number 103 |

The state of the transaction number manager 130 (i.e., state of the context stacks) for line 5 of table 1A is shown in the table 5B below:

TABLE 5B

Transaction 1: (101, 0), (101, 2)
Transaction 2: (102, 0) -> (102, 0), (102, 0)
Transaction 3: (103, 0)

The state of log manager 138 for line 5 of the table 1A is shown in table 5C below:

TABLE 5C

| | |
|---|---|
| Insert | LSM transaction number = (101, 0), primary key is 1 (p = 1), x = 101 |
| Insert | LSM transaction number = (101, 0), primary key is 2 (p = 2), x = 102 |
| Insert | LSM transaction number = (101, 2), primary key is 1 (p = 1), x = 767 |

The state for the transactions for line 5 of table 1A is shown in the table 5D below:

TABLE 5D

| | | |
|---|---|---|
| Transaction 1 | ID = 101 | newest sequence number = 3 |
| Transaction 2 | ID = 102 | newest sequence number = 1 |
| Transaction 3 | ID = 103 | newest sequence number = 0 |

The state for the primary key for line 5 of table 1A is shown in table 5E below:

TABLE 5E

| | |
|---|---|
| Primary key is 1 (p = 1) | Row version record (LSM transaction number = (102, 0), sequence number = 1, lock mode = no key update, granted = false, cid = 1, p = 1, and x = 2), Row version record (LSM transaction number = (101, 2), sequence number = 3, lock mode = no key update, granted = true, cid = 2, p = 1, and x = 767), Row version record (LSM transaction number = (101, 0), sequence number = 1, lock mode = no key update, granted = true, cid = 1, p = 1, and x = 101), Row version record (transaction counter number = 1, p = 1, x = 1) |
| Primary key is 2 (p = 2) | Row version record (LSM transaction number = (101, 0), sequence number = 2, lock mode = no key update, granted = true, cid = 1, p = 2, and x = 102), Row version record (transaction counter number = 1, p = 2, x = 2) |

As shown in line 6 of the table 1A, transaction 1 may rolls back to a savepoint s1. The transaction number manager 130 may log the target of the rollback (i.e., (101, 2)), and may perform a rollback operation with the storage 140 with this same LSM transaction number. In the rollback operation, the list of transaction 1's row version records may be reviewed in reverse sequence number order (e.g., from largest to smallest) until it finds a row version record having an LSM transaction number smaller than the rollback target. During this list traversal, the key bucket latch for each row version record it visits may be acquired. While holding the latch, it is able to both unlink the rolled-back records from the storage 140 data structures and check whether any blocked row level lockers can be unblocked due to the release of implicit row locks associated with the row version records. The row version record having LSM transaction number (101, 2) and the sequence number 3 may be removed from the storage 140. This may not allow transaction 2 to obtain its pending row lock on transaction 1, since there is an uncommitted row version record for primary key 1, which is the row version record having LSM transaction number (101, 0) and sequence number 1. The newest sequence number associated with transaction 1 may be rolled back to 2. The transaction number manager 130 may retrieve the subtransaction context corresponding to savepoint s1.

The status of the lock manager 125 for line 6 of table 1A is shown in table 6A below:

TABLE 6A

| | |
|---|---|
| Locktag transaction (101) | Exclusive lock by transaction number 101; transaction number 102 waiting for shared lock |
| Locktag transaction (102) | Exclusive lock by transaction number 102 |
| Locktag transaction (103) | Exclusive lock by transaction number 103 |

The status of the transaction number manager 130 (i.e., state of the context stacks) for line 6 of table 1A is shown in the table 6B below:

TABLE 6B

Transaction 1: (101, 0), (101, 2) -> (101, 0)
Transaction 2: (102, 0), (102, 0)
Transaction 3: (103, 0)

The state of the log manager 138 for line 6 of the table 1A is shown in table 6C below:

TABLE 6C

| Insert | LSM transaction number = (101, 0), primary key is 1 (p = 1), x = 101 |
| Insert | LSM transaction number = (101, 0), primary key is 2 (p = 2), x = 102 |
| Insert | LSM transaction number = (101, 2), primary key is 1 (p = 1), x = 767 |
| Rollback | LSM transaction number = (101, 2) |

The state for the transactions for line 6 of table 1A is shown in the table 6D below:

TABLE 6D

| Transaction 1 | ID = 101 | newest sequence number = 2 |
| Transaction 2 | ID = 102 | newest sequence number = 1 |
| Transaction 3 | ID = 103 | newest sequence number = 0 |

The state for the primary key for line 6 of table 1A is shown in table 6E below:

TABLE 6E

| Primary key is 1 (p = 1) | Row version record (LSM transaction number = (102, 0), sequence number = 1, lock mode = no key update, granted = false, cid = 1, p = 1, and x = 2), Row version record (LSM transaction number = (101, 0), sequence number = 1, lock mode = no key update, granted = true, cid = 1, p = 1, and x = 101), Row version record (transaction counter number = 1, p = 1, x = 1) |
| Primary key is 2 (p = 2) | Row version record (LSM transaction number = (101, 0), sequence number = 2, lock mode = no key update, granted = true, cid = 1, p = 2, and x = 102), Row version record (transaction counter number = 1, p = 2, x = 2) |

In line 7 of the table 1A above, transaction 3 may start a new subtransaction for processing its first command identification statement (i.e., cid=1). The transaction number manager 130 may retrieve the LSM transaction number for the subtransaction (i.e., (103, 0)), and the subtransaction context may be pushed onto the context stack for transaction number 103. The transaction number manager 130 may perform an operation so as to a scan over the rows of table for the transaction number 102 and the snapshot transaction counter number 1 with a scan key that will return rows having a primary key of 1. A row version record is returned, which is a committed version having a transaction counter number of 1. This may be visible to transaction 3, as the transaction counter number of 1 is less than or equal to transaction 3's snapshot transaction counter number, while the uncommitted row version record from transaction 1 is not visible. Transaction 3 may proceed to process the update by inserting a record into the storage 140 so as to record a new version of the row having x=3. The lock mode may be a no key update mode, but there may be a conflict with the granted implicit no key update mode row lock held by transaction 1 and the pending implicit no key update row lock requested by transaction 2. A row version record for transaction 3's update may be created in the storage 140 while the key bucket latch for the primary key of 1 is held, and the flag may be set to false (i.e., granted flag=false). The current row lock state may be determined for the primary key of 1, and it may be determined that transaction 3 is proximally blocked by transaction 2 (i.e., transaction number 102). Transaction 3 may wait for transaction 2 to finish or explicitly release its row lock on the primary key having a value of 1. The storage 140 may block transaction 3 by attempting to acquire the locktag for the transaction number 102 lock in shared mode. Transaction 2 may be active, and the transaction number manager 130 may be maintaining an exclusive lock on the locktag for transaction number 102, so the shared lock request may wait (i.e., "sleep").

The status of the lock manager 125 for line 7 of table 1A is shown in table 7A below:

TABLE 7A

| Locktag transaction (101) | Exclusive lock by transaction number 101; transaction number 102 waiting for shared lock |
| Locktag transaction (102) | Exclusive lock by transaction number 102; transaction number 103 waiting for shared lock |
| Locktag transaction (103) | Exclusive lock by transaction number 103 |

The status of the transaction number manager 130 (i.e., status of the context stacks) for line 7 of table 1A is shown in the table 7B below:

TABLE 7B

Transaction 1: (101, 0)
Transaction 2: (102, 0), (102, 0)
Transaction 3: (103, 0) -> (103, 0), (103, 0)

The state for the log manager 138 for line 7 of the table 1A is shown in table 7C below:

TABLE 7C

| Insert | LSM transaction number = (101, 0), primary key is 1 (p = 1), x = 101 |
| Insert | LSM transaction number = (101, 0), primary key is 2 (p = 2), x = 102 |
| Insert | LSM transaction number = (101, 2), primary key is 1 (p = 1), x = 767 |
| Rollback | LSM transaction number = (101, 2) |

The state for the transactions for line 7 of table 1A is shown in the table 7D below:

TABLE 7D

| Transaction 1 | ID = 101 | newest sequence number = 2 |
| Transaction 2 | ID = 102 | newest sequence number = 1 |
| Transaction 3 | ID = 103 | newest sequence number = 1 |

The state for the primary key for line 7 of table 1A is shown in table 7E below:

TABLE 7E

| Primary key is 1 (p = 1) | Row version record (LSM transaction number = (103, 0), sequence number = 1, lock mode = no key update, granted = false, cid = 1, p = 1, and x = 3), Row version record (LSM transaction number = (102, 0), sequence number = 1, lock mode = no key update, granted = true, cid = 1, p = 1, and x = 2), Row version record (LSM transaction number = (101, 0), sequence number = 1, lock mode = no key update, granted = true, cid = 1, p = 1, and x = 101), Row version record (transaction counter number = 1, p = 1, x = 1) |
| Primary key is 2 (p = 2) | Row version record (LSM transaction number = (101, 0), sequence number = 2, lock mode = no key update, granted = true, cid = 1, p = 2, and x = 102), Row version record (transaction counter number = 1, p = 2, x = 2) |

In line 8 of the table 1A above, the transaction 1 may be aborted. The transaction number manager 130 may log the abort with the log manager 138, and may perform an operation on the storage 140 to abort the transaction for the transaction number 101. In the abort transaction operation, there may be a review (e.g., "walk") of the list of transaction 1's row version records in reverse sequential order in the storage 140. During this list traversal, the storage 140 may acquire the key bucket latch for each row version record it visits. While holding the latch, the records from the storage 140 data structures may be unlinked, and there may be a check of whether any blocked row level lockers can be unblocked due to the release of implicit row locks associated with the row version records. In this case, aborting transaction 1 releases the row lock for the primary key 1. A list of pending locks for primary key 1 may be examined, and it may be determined that transaction 2 is next in line for the lock, and a wakeup the blocked locktag transaction lock for transaction number 101 may be performed. The abort transaction operation may release the transaction header record for the transaction number 101 for reuse. The transaction number manager 130 may purge transaction 1's transaction context stack and releases its exclusive lock on the locktag for transaction (101). The lock manager 125 may "garbage—collect" the locktag transaction (101) once it is no longer referenced.

The status of the lock manager 125 for line 8 of table 1A is shown in table 8A below:

TABLE 8A

| | |
|---|---|
| Locktag transaction (101) | unreferenced |
| Locktag transaction (102) | Exclusive lock by transaction number 102; transaction number 103 waiting for shared lock |
| Locktag transaction (103) | Exclusive lock by transaction number 103 |

The status of the transaction number manager 130 (i.e., status of the context stacks) for line 8 of table 1A is shown in the table 8B below:

TABLE 8B

Transaction 1: (101, 0) -> empty
Transaction 2: (102, 0), (102, 0)
Transaction 3: (103, 0), (103, 0)

The state of the log manager 138 for line 8 of the table 1A is shown in table 8C below:

TABLE 8C

| | |
|---|---|
| Insert | LSM transaction number = (101, 0), primary key is 1 (p = 1), x = 101 |
| Insert | LSM transaction number = (101, 0), primary key is 2 (p = 2), x = 102 |
| Insert | LSM transaction number = (101, 2), primary key is 1 (p = 1), x = 767 |
| Rollback | LSM transaction number = (101, 2) |
| Abort | Transaction number 101 |

The state for the transactions for line 8 of table 1A is shown in the table 8D below:

TABLE 8D

| Transaction 2 | ID = 102 | newest sequence number = 1 |
|---|---|---|
| Transaction 3 | ID = 103 | newest sequence number = 1 |

The state for the primary key for line 8 of table 1A is shown in table 8E below:

TABLE 8E

| | |
|---|---|
| Primary key is 1 (p = 1) | Row version record (LSM transaction number = (103, 0), sequence number = 1, lock mode = no key update, granted = false, cid = 1, p = 1, and x = 3), Row version record (LSM transaction number = (102, 0), sequence number = 1, lock mode = no key update, granted = false, cid = 1, p = 1, and x = 2), Row version record (transaction counter number = 1, p = 1, x = 1) |
| Primary key is 2 (p = 2) | Row version record (transaction counter number = 1, p = 2, x = 2) |

As shown in line 9 of the table 1A above, transaction 2 was unblocked by the abort operation of transaction 1 on line 8 (i.e., the rollback operation). The lock manager 125 may regain control after notification of the lock release, may reacquire the bucket latch for the primary key of 1, and may examine the current lock state for the key. Transaction 2 can acquire a "no key granted" lock on the key, so a flag on transaction 2's pending row version record is set to true (i.e., granted flag=true), and the blocked operation to insert a record into the storage 140 from line 5 of the table 1A above may continue (i.e., there is no snapshot violation) and the bucket latch may be released. The insert may be logged by the log manager 138. The transaction number manager 130 may retrieve the transaction context for the update statement, and may proceed to process the commit. Via the transaction number manager 130, a transaction counter number is assigned to transaction 2 (where the transaction counter number is 2 in this case) as a side effect of logging the commit record with the log manager 138. A commit transaction operation may be called to stamp a transaction counter number of 2 on transaction 2's transaction header in the storage 140. At this point in table 1A, transaction 2 data is committed and visible to any transaction having a snapshot transaction counter number that is greater than or equal to 2. The transaction number manager 130 may discontinue the exclusive lock on the locktag transaction (102) and purge transaction 2's transaction context. A post commitment transaction may be called to stamp a transaction counter number of 2 on transaction 2's row version records and release the transaction header record for transaction number 102 for reuse in the storage 140. For a top-level commit or abort, there may be no need to explicitly release row locks via notification. Any blocked backends may awake naturally when the exclusive lock on the locktag transaction (102) is released.

The status of the lock manager 125 for line 9 of table 1A is shown in table 9A below:

TABLE 9A

| | |
|---|---|
| Locktag transaction (101) | unreferenced |
| Locktag transaction (102) | Unlocked; transaction number 103 waiting for shared lock |
| Locktag transaction (103) | Exclusive lock by transaction number 103 |

The status of the transaction number manager 130 (i.e., status of the context stacks) for line 9 of table 1A is shown in the table 9B below:

TABLE 9B

Transaction 1: empty
Transaction 2: (102, 0), (102, 0) -> (102, 0) -> empty
Transaction 3: (103, 0), (103, 0)

The state of the log manager 138 for line 9 of the table 1A is shown in table 9C below:

TABLE 9C

| | |
|---|---|
| Insert | LSM transaction number = (101, 0), primary key is 1 (p = 1), x = 101 |
| Insert | LSM transaction number = (101, 1), primary key is 2 (p = 2), x = 102 |
| Insert | LSM transaction number = (101, 2), primary key is 1 (p = 1), x = 767 |
| Rollback | LSM transaction number = (101, 2) |
| Abort | Transaction number 101 |
| Insert | LSM transaction number = (102, 0), p = 1, x = 2 |
| Commit | Transaction number = 102, transaction counter number = 2 |

The state for the transactions for line 9 of table 1A is shown in the table 9D below:

TABLE 9D

| | | |
|---|---|---|
| Transaction 3 | ID = 103 | newest sequence number = 1 |

The state for the primary key for line 9 of table 1A is shown in table 9E below:

TABLE 9E

| | |
|---|---|
| Primary key is 1 (p = 1) | Row version record (LSM transaction number = (103, 0), sequence number = 1, lock mode = no key update, granted = false, cid = 1, p = 1, and x = 3), Row version record (transaction counter number = 2, p = 1, x = 2), Row version record (transaction counter number = 1, p = 1, x = 1) |
| Primary key is 2 (p = 2) | Row version record (transaction counter number = 1, p = 2, x = 2) |

As shown in line 10 of the table 1A above, the transaction 3 may be unblocked by the commit of transaction 2 shown in line 9 of the table 1A. The lock manager 125 may regain control after transaction 3 acquires the shared lock on locktag transaction (102), releases the shared lock, reacquires the bucket latch for the primary key 1, and examines the current lock state for the key. Transaction 3 may acquire a NoKeyGranted lock on the key (primary key), so the flag on transaction 3's pending row version record is set to true (i.e., granted flag=true), and the blocked operation to insert a record to the storage 140 from line 7 of the table 1A may continue. However, in this case, there is a snapshot violation. Transaction 3 may be attempting to insert a row version record at snapshot transaction counter number 1, but there is a committed row version record for the primary key 1 having transaction counter number of 2. The bucket latch may be released, and an insert record operation may return an error indicating that there has been a snapshot violation. In some implementations, the statement may be rolled back and restarted with a new snapshot transaction counter number. The transaction number manager 130 may log the rollback with the log manager 138 to the start of the statement at LSM transaction number (103, 0) and may perform a storage 140 rollback operation to purge the pending row version record for the primary key 1. In this case, there are no blocked waiters needing notification. The transaction number manager 130 may retrieve the statement's subtransaction context.

In another example, using the table 1A above, the operations may be performed using a snapshot transaction counter number of 2. Transaction 3 may start a new subtransaction for processing its first command identification statement (cid=1). The transaction number manager 130 may perform a begin subtransaction operation to obtain the LSM transaction number for the subtransaction (i.e., (103, 0)). This subtransaction context may be pushed onto the context stack of the transaction number manager 130 for transaction number 103. A scan open operation may be performed to open a scan over the rows of the table in the storage 140 for the transaction number 102 and snapshot transaction counter number of 1, with a scan key that will return rows having a primary key of 1. A row version record may be returned, with the committed version having a transaction counter number of 2. This row version record may be visible to transaction 3, since the transaction counter number of 2 is less than or equal to transaction 3's snapshot transaction counter number. Transaction 3 may proceed to process the update by performing an insert record operation to record a new version of the row having an x value of 3. The lock mode may be "no key update." There may be no lock conflict, so the storage 140 may create a row version record for transaction 3's update while holding the key bucket latch for the primary key of 1, setting the flag to true (i.e., granted flag=true). The bucket latch may be released, and the insert may be logged by the log manager 138. The transaction number manager 130 may retrieve the transaction context for the update statement, and may proceed to process the commit. Via the transaction number manager 130, a transaction counter number may be assigned to transaction 3 (i.e., the transaction counter number may be 3 in this case) when the log manager 138 logs the commit record. A commit transaction may be performed on the storage 140 to stamp a transaction counter number of 3 on transaction 3's transaction header. The transaction number manager 130 may remove the exclusive lock on the locktag transaction (103) and purge transaction 3's transaction context. A post commit transaction may be called to stamp a transaction counter number 3 on transaction 3's row version records in the storage 140 and release the transaction header record for the transaction number 103 for reuse.

The status of the lock manager 125 starting at line 7 of table 1A, using the snapshot transaction counter number of 2, is shown in table 10A below:

TABLE 10A

| | |
|---|---|
| Locktag transaction (101) | unreferenced |
| Locktag transaction (102) | Shared lock by transaction number 103 (immediately released) -> unreferenced |
| Locktag transaction (103) | unreferenced |

The status of the transaction number manager 130 (i.e., status of the context stacks) starting at line 7 of table 1A, using the snapshot transaction counter number of 2, is shown in the table 10B below:

TABLE 10B

Transaction 1: empty
Transaction 2: empty
Transaction 3: (103, 0), (103, 0) -> (103, 0) -> (103, 0), (103, 0) -> (103, 0) -> empty The state of the log manager 138 starting at line 7 of the table 1A, using the snapshot transaction counter number of 2, is shown in table 10C below:

TABLE 10C

| | |
|---|---|
| Insert | LSM transaction number = (101, 0), primary key is 1 (p = 1), x = 101 |
| Insert | LSM transaction number = (101, 1), primary key is 2 (p = 2), x = 102 |
| Insert | LSM transaction number = (101, 2), primary key is 1 (p = 1), x = 767 |
| Rollback | LSM transaction number = (101, 2) |
| Abort | Transaction number 101 |
| Insert | LSM transaction number = (102, 0), p = 1, x = 2 |
| Commit | Transaction number = 102, transaction counter number = 2 |
| Rollback | LSM transaction number (103, 0) |
| Insert | LSM transaction number (103, 0), p = 1, x = 3) |
| Commit | Transaction number = 103, transaction counter number = 3 |

The state for the primary key starting at line 7 of table 1A, using the snapshot transaction counter number of 2, is shown in table 10D below:

TABLE 10D

| | |
|---|---|
| Primary key is 1 (p = 1) | Row version record (transaction counter number = 3, p = 1, x = 3), Row version record (transaction counter number = 2, p = 1, x = 2), Row version record (transaction counter number = 1, p = 1, x = 1) |
| Primary key is 2 (p = 2) | Row version record (transaction counter number = 1, p = 2, x = 2) |

The example below is directed towards explicit row locking. In the table 11A shown below, there may be three transaction histories.

TABLE 11A

| | Transaction 1 (transaction number = 101; snapshot transaction counter number is 1) | Transaction 2 (transaction number = 102; snapshot transaction counter number is 1) | Transaction 3 (transaction number = 103; snapshot transaction counter number is 1) |
|---|---|---|---|
| 1 | Begin | Begin | Begin |
| 2 | Select primary key from the table (t) where primary key is 1 for share | | |
| 3 | | Select primary key from the table (t) where primary key is 1 for share | |
| 4 | | | Update table; set x = 3, where the primary key is 1 |
| 5 | rollback | | |
| 6 | | rollback | |
| 7 | | | rollback |

As shown in line 1 of table 11A, the three top-level transactions transaction 1, transaction 2 and transaction 3 are created. The transaction number manager 130 in may assigns a transaction number (i.e., transaction numbers 101, 102, and 103, respectively, in this example), creates the transaction context, and performs a begin transaction operation (i.e., to register that there is an active transaction having that transaction number). The begin transaction operation may initialize the LSM transaction number value with the transaction sequence number of the beginning of the transaction (i.e., the sequence number zero) and the LSM transaction number is located in the transaction context. Additionally, the transaction number manager 130 acquires exclusive locks in the lock manager 125 having lock tags of locktag transaction (101), locktag transaction (102), and locktag transaction (103). No log records may be generated by any of these operations.

The state of the lock manager 125 for line 1 of table 11A is shown below in table 11B:

TABLE 11B

| | |
|---|---|
| Locktag transaction (101) | Exclusive lock by transaction number 101 |
| Locktag transaction (102) | Exclusive lock by transaction number 102 |
| Locktag transaction (103) | Exclusive lock by transaction number 103 |

The status of the transaction number manager 130 (i.e., status of the context stacks) for line 1 of table 11A is shown in the table 11C below:

TABLE 11C

| |
|---|
| Transaction 1: empty -> (101, 0) |
| Transaction 2: empty -> (102, 0) |
| Transaction 3: empty -> (103, 0) |

The state of the log manager 138 for line 1 of the table 11A is shown in table 11D below:

TABLE 11D

| |
|---|
| No Output |

The state for the transactions for line 1 of table 11A is shown in the table 11E below:

TABLE 11E

| | |
|---|---|
| Transaction 1 | ID = 101, newest sequence number = 0 |
| Transaction 2 | ID = 102, newest sequence number = 0 |
| Transaction 3 | ID = 103, newest sequence number = 0 |

The state for the primary key for line 1 of table 11A is shown in table 11F below:

TABLE 11F

| | |
|---|---|
| Primary key is 1 (p = 1) | Row version record (transaction counter number = 1, p = 1, x = 1) |
| Primary key is 2 (p = 2) | Row version record (transaction counter number = 1, p = 2, x = 2) |

As shown in line 2 of the table above, the transaction 1 may start a new subtransaction to process its first command identification statement (cid=1). The transaction number manager 130 may perform a begin subtransaction operation, and may obtain the LSM transaction number value for the subtransaction (i.e., (101, 0)). This subtransaction context may be pushed onto the context stack of the transaction number manager 130 for transaction number 101. Processing of a "select for share" statement may include performing a lock acquire with a lock mode of "share" for primary key of 1 (p=1). Within the lock acquire operation, the storage 140 may latch the key bucket for the primary key of 1 (p=1), and examine the current lock state for the key. There may be no granted row locks, so a row lock record (i.e., where granted=true) is inserted onto the record chain for the key. The bucket lock may be released, and the lock acquire operation may returns to a normal operating state. In some implementations, there may be no logging of lock acquisitions. When the update operation is complete, the transaction number manager 130 may retrieve the subtransaction context for the statement.

The state of the lock manager 125 for line 2 of table 11A is shown below in table 12A:

TABLE 12A

| | |
|---|---|
| Locktag transaction (101) | Exclusive lock by transaction number 101 |
| Locktag transaction (102) | Exclusive lock by transaction number 102 |
| Locktag transaction (103) | Exclusive lock by transaction number 103 |

The status of the transaction number manager 130 (i.e., status of the context stacks) for line 2 of table 11A is shown in the table 12B below:

TABLE 12B

Transaction 1: (101, 0) -> (101, 0), (101, 0) -> (101, 0)
Transaction 2: (102, 0)
Transaction 3: (103, 0)

The state of the log manager 138 for line 2 of the table 11A is shown in table 12C below:

TABLE 12C

No Output

The state for the transactions for line 2 of table 11A is shown in the table 12D below:

TABLE 12D

| | |
|---|---|
| Transaction 1 | ID = 101, newest sequence number = 1 |
| Transaction 2 | ID = 102, newest sequence number = −1 |
| Transaction 3 | ID = 103, newest sequence number = −1 |

The state for the primary key for line 1 of table 11A is shown in table 12E below:

TABLE 12E

| | |
|---|---|
| Primary key is 1 (p = 1) | Row lock record (LSM transaction number = (101, 0), sequence number = 1, lock mode = shared, granted = true, cid = 1, p = 1), Row version record (transaction counter number = 1, p = 1, x = 1) |
| Primary key is 2 (p = 2) | Row version record (transaction counter number = 1, p = 2, x = 2) |

As shown in line 3 of the table above, transaction 2 may begin a new subtransaction for processing its first command identification statement (cid=1). The transaction number manager 130 may perform a begin subtransaction operation, and may obtain the LSM transaction number value for the subtransaction (i.e., (102, 0)). This subtransaction context may be pushed onto the context stack of the transaction number manager 130 for the transaction number 102. The processing of the "select for share" statement include a lock acquire operation with a lock mode of "share" for the primary key of 1 (p=1). Within the lock acquire operation, the storage 140 may latch the key bucket for the primary key of 1 (p=1), and may examine the current lock state for the key. This lock request may be compatible with the "shared" lock granted to transaction 1, so a row lock record (i.e., with granted=true) is inserted onto the record chain for the key. The bucket lock may be released, and the lock acquire operation may returns to normal operation. In some implementations, there is no logging for lock acquisitions. Once the update operation is complete, the transaction number manager 130 may retrieve the subtransaction context for the statement.

The state of the lock manager 125 for line 3 of table 11A is shown below in table 13A:

TABLE 13A

| | |
|---|---|
| Locktag transaction (101) | Exclusive lock by transaction number 101 |
| Locktag transaction (102) | Exclusive lock by transaction number 102 |
| Locktag transaction (103) | Exclusive lock by transaction number 103 |

The status of the transaction number manager 130 (i.e., status of the context stacks) for line 3 of table 11A is shown in the table 13B below:

TABLE 13B

Transaction 1: (101, 0)
Transaction 2: (102, 0) -> (102, 0),, (102, 0) -> (102, 0)
Transaction 3: (103, 0)

The state of the log manager 138 for line 3 of the table 11A is shown in table 13C below:

TABLE 13C

No Output

The state for the transactions for line 3 of table 11A is shown in the table 13D below:

TABLE 13D

| | |
|---|---|
| Transaction 1 | ID = 101, newest sequence number = 1 |
| Transaction 2 | ID = 102, newest sequence number = 1 |
| Transaction 3 | ID = 103, newest sequence number = −1 |

The state for the primary key for line 3 of table 11A is shown in table 13E below:

TABLE 13E

| | |
|---|---|
| Primary key is 1 (p = 1) | Row lock record (LSM transaction number = (102, 0), sequence number = 1, lock mode = shared, granted = true, cid = 1, p = 1), Row lock record (LSM transaction number = (101, 0), sequence number = 1, lock mode = shared, granted = true, cid = 1, p = 1), Row version record (transaction counter number = 1, p = 1, x = 1) |
| Primary key is 2 (p = 2) | Row version record (transaction counter number = 1, p = 2, x = 2) |

As shown in line 4 of the table above, transaction 3 starts a new subtransaction to process its first command identification statement (cid=1). The transaction number manager 130 may invoke and/or perform a begin subtransaction operation, and may obtain the LSM transaction number value for the subtransaction (i.e., (103, 0)). This subtransaction context may be pushed onto the context stack of the transaction number manager 130 for the transaction number 103. Processing of the "update" statement may perform an insert record operation with a lock mode of "no key update" for the primary key of 1 (p=1) to insert a new version of the row with x=3. Within an insert record operation, the storage 140 may latch the key bucket for primary key of 1 (p=1), and may examine the current lock state for the key. The update request may not be compatible with the shared locks granted to transaction 1 and transaction 2, so a row version record (i.e., where granted=false) may be inserted onto the record chain for the key, and the transaction 3 may go to sleep on a shared request for the locktag transaction (102) lock. The bucket latch may be released via a callback from a sleep operation.

The state of the lock manager 125 for line 4 of table 11A is shown below in table 14A:

TABLE 14A

| | |
|---|---|
| Locktag transaction (101) | Exclusive lock by transaction number 101 |
| Locktag transaction (102) | Exclusive lock by transaction number 102; transaction number 103 is waiting for a shared lock |
| Locktag transaction (103) | Exclusive lock by transaction number 103 |

The status of the transaction number manager 130 (i.e., status of the context stacks) for line 4 of table 11A is shown in the table 14B below:

TABLE 14B

| |
|---|
| Transaction 1: (101, 0) |
| Transaction 2: (102, 0) |
| Transaction 3: (103, 0) -> (103, 0), (103, 0) |

The state of the log manager 138 for line 4 of the table 11A is shown in table 14C below:

TABLE 14C

| |
|---|
| No Output |

The state for the transactions for line 4 of table 11A is shown in the table 14D below:

TABLE 14D

| | |
|---|---|
| Transaction 1 | ID = 101, newest sequence number = 1 |
| Transaction 2 | ID = 102, newest sequence number = 1 |
| Transaction 3 | ID = 103, newest sequence number = 1 |

The state for the primary key for line 4 of table 11A is shown in table 14E below:

TABLE 14E

| | |
|---|---|
| Primary key is 1 (p = 1) | Row lock record (LSM transaction number = (103, 0), sequence number = 1, lock mode = no key update, granted = false, cid = 1, p = 1, x = 3), Row lock record (LSM transaction number = (102, 0), sequence number = 1, lock mode = shared, granted = true, cid = 1, p = 1), Row lock record (LSM transaction number = (101, 0), sequence number = 1, lock mode = shared, granted = true, cid = 1, p = 1), Row version record (transaction counter number = 1, p = 1, x = 1) |
| Primary key is 2 (p = 2) | Row version record (transaction counter number = 1, p = 2, x = 2) |

Line 5 of the table above shows that transaction 1 aborts (i.e., a rollback operation occurs). The transaction number manager 130 may log the abort with the log manager 138, and may invoke an abort transaction for XID 101. In a storage 140 abort transaction operation, the storage 140 may traverse (i.e., "walk") its list of transaction 1's records in reverse sequential order. During this list traversal, the storage 140 may acquire the key bucket latch for each row version record and/or row lock record it visits. While holding the latch, the records from the storage 140 data structures may be unlinked and it may be determined whether any blocked row level lockers can be unblocked because of the release of implicit or explicit row locks. In this case, aborting transaction 1 releases the shared row lock for p=1. After examining the list of pending lockers for the primary key 1 (i.e., p=1), the storage 140 may determine that the transaction 3 remains blocked by the transaction 2, so the transaction 3 is not notified to wake up. The operation abort transaction may also release the transaction header record for the transaction number 101 for reuse. Upon return from the abort transaction operation, the transaction number manager 130 may purge transaction 1's transaction context stack in the transaction number manager 130, and may release its exclusive lock on the locktag transaction (101).

The state of the lock manager 138 for line 5 of table 11A is shown below in table 15A:

TABLE 15A

| | |
|---|---|
| Locktag transaction (101) | Exclusive lock by transaction number 101 -> unreferenced |
| Locktag transaction (102) | Exclusive lock by transaction number 102; transaction number 103 is waiting for a shared lock |
| Locktag transaction (103) | Exclusive lock by transaction number 103 |

The status of the transaction number manager 130 (i.e., status of the context stacks) for line 5 of table 11A is shown in the table 15B below:

TABLE 15B

| |
|---|
| Transaction 1: (101, 0) -> empty |
| Transaction 2: (102, 0) |
| Transaction 3: (103, 0), (103, 0) |

The state of the log manager 138 for line 5 of the table 11A is shown in table 15C below:

TABLE 15C

| |
|---|
| Abort (transaction number 101) |

The state for the transactions for line 5 of table 11A is shown in the table 15D below:

TABLE 15D

| | |
|---|---|
| Transaction 2 | ID = 102, newest sequence number = 1 |
| Transaction 3 | ID = 103, newest sequence number = 1 |

The state for the primary key for line 5 of table 11A is shown in table 15E below:

TABLE 15E

| | |
|---|---|
| Primary key is 1 (p = 1) | Row lock record (LSM transaction number = (103, 0), sequence number = 1, lock mode = no key update, granted = false, cid = 1, p = 1, x = 3), Row lock record (LSM transaction number = (102, 0), sequence number = 1, lock mode = shared, granted = true, cid = 1, p = 1), Row lock record (LSM transaction number = (101, 0), sequence number = 1, lock mode = shared, granted = true, cid = 1, p = 1), Row version record (transaction counter number = 1, p = 1, x = 1) |
| Primary key is 2 (p = 2) | Row version record (transaction counter number = 1, p = 2, x = 2) |

Line 6 of the table above shows that transaction 2 aborts (i.e., a rollback operation occurs). The transaction number manager 130 may log the abort with the log manager 138, and may invoke an abort transaction operation for transaction number 102. In the abort transaction, there may be a traversal of the list of transaction 2's records in reverse sequential order in the storage 140. Aborting transaction 1 releases the shared row lock for the primary key of 1 (p=1). After examining the list of pending lockers for p=1, the storage 140 may determine that the transaction 3 may acquire the row lock, and may call a wake up operation the backend blocked on the locktag transaction lock for transaction number 102 by calling a wakeup operation. The abort transaction may also release the transaction header record for the transaction number 102 for reuse. Upon return from the abort transaction operation, the transaction number manager 130 may purge the transaction 2's transaction context stack of the transaction number manager 130, and may release its exclusive lock on the locktag transaction (102).

The state of the lock manager 125 for line 6 of table 11A is shown below in table 16A:

TABLE 16A

| | |
|---|---|
| Locktag transaction (101) | Exclusive lock by transaction number 101 -> unreferenced |
| Locktag transaction (102) | Unlocked; transaction number 103 is waiting for a shared lock |
| Locktag transaction (103) | Exclusive lock by transaction number 103 |

The status of the transaction number manager 130 (i.e., status of the context stacks) for line 6 of table 11A is shown in the table 16B below:

TABLE 16B

Transaction 1: empty
Transaction 2: (102, 0) -> empty
Transaction 3: (103, 0), (103, 0)

The state of the log manager 138 for line 6 of the table 11A is shown in table 16C below:

TABLE 16C

Abort (transaction number 101)
Abort (transaction number 102)

The state for the transactions for line 6 of table 11A is shown in the table 16D below:

TABLE 16D

| | |
|---|---|
| Transaction 3 | ID = 103, newest sequence number = 1 |

The state for the primary key for line 6 of table 11A is shown in table 16E below:

TABLE 16E

| | |
|---|---|
| Primary key is 1 (p = 1) | Row lock record (LSM transaction number = (103, 0), sequence number = 1, lock mode = no key update, granted = false, cid = 1, p = 1, x = 3), Row version record (transaction counter number = 1, p = 1, x = 1) |
| Primary key is 2 (p = 2) | Row version record (transaction counter number = 1, p = 2, x = 2) |

Line 7 in the table above shows transaction 3 was unblocked by the abort of transaction 2 at line 6. The lock manager 125 may regain control after transaction 3 is awoken with a "status notified" from the lock manager 125's attempt to acquire the shared lock locktag transaction (102). The lock manager 125 may reacquire the bucket latch for the primary key of 1 (p=1), and may examine the current lock state for the key. Transaction 3 may acquire a "no key granted" lock on the key, so the flag on transaction 3's pending row version record is set to true (i.e., granted flag=true) and the blocked call to an insert record operation from line 4 of the table above may continue. The bucket latch may be released, and the insert may be logged by the log manager 138. The transaction number manager 130 may retrieve the transaction context for the update statement, and may process the commit. Via the transaction number manager 130, the transaction counter number is assigned to transaction 3 (where the transaction counter number is 2 in this case) as a side effect of logging the commit record. A commit transaction operation may be performed to stamp a transaction counter number 2 on transaction 3's transaction header. The transaction number manager 130 may drop its exclusive lock on the locktag transaction (103) and purge transaction 3's transaction context. A post commit transaction operation may be performed to stamp a transaction counter number of 2 on transaction 3's row version records and release the transaction header record for the transaction number 103 for reuse.

The state of the lock manager 125 for line 7 of table 11A is shown below in table 17A:

TABLE 17A

| | |
|---|---|
| Locktag transaction (101) | Unreferenced |
| Locktag transaction (102) | Unreferenced |
| Locktag transaction (103) | Exclusive lock by transaction number 103 -> unreferenced |

The status of the transaction number manager 130 (i.e., status of the context stacks) for line 7 of table 11A is shown in the table 17B below:

TABLE 17B

Transaction 1: empty
Transaction 2: empty
Transaction 3: (103, 0), (103, 0) -> (103, 0), -> empty The state of the log manager 138 for line 7 of the table 11A is shown in table 17C below:

TABLE 17C

Abort (transaction number 101)
Abort (transaction number 102)
Insert (LSM transaction number 103, 0), p = 1, x = 3
Commit (LSM transaction number 103, transaction counter number 102)

The state for the transactions for line 7 of table 11A is shown in the table 17D below:

TABLE 17D

| | |
|---|---|
| Transaction 3 | ID = 103, newest sequence number = 1 |

The state for the primary key for line 7 of table 11A is shown in table 17E below:

TABLE 17E

| | |
|---|---|
| Primary key is 1 (p = 1) | Row version record (transaction counter number = 2, p = 1, x = 3) |
| | Row version record (transaction counter number = 1, p = 1, x = 1) |
| Primary key is 2 (p = 2) | Row version record (transaction counter number = 1, p = 2, x = 2) |

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method of managing digital data for a plurality of tenants to software instances, each tenant comprising a group of users who share a common access with a specific set of privileges to a software instance of an application, wherein each of the instances is implemented on at least one of a plurality of instance nodes of a server system in communication with each other, and wherein the managing includes managing multiversion concurrency control of different instances of the digital data which may be stored in one or more storage device locations communicatively coupled to the server system as records, each of which is identified by a key that includes identification of one or more rows in a table of a database, the method comprising:
receiving, at the server system, a query regarding a transaction counter number;
when a transaction header identifying data is updated with the assigned transaction counter number at the server system, using the updated transaction header identifying data as an instance of multiversion concurrency control information by the received query;
performing, at the server system, a key lookup in the table of the database based on the received query;
when the key lookup encounters an uncommitted row, accessing, at the one or more storage device locations communicatively coupled to the server system, a corresponding transaction header identifying data to identify a data array element to determine whether a transaction number is committed, and determine its corresponding transaction counter number; and
stamping, at the server system, a transaction counter number on the row version record.

2. The method of claim 1, wherein the accessing the corresponding transaction header comprises:
identifying the data array element using a transaction header index field on the row version record and a row lock record.

3. The method of claim 1, further comprising:
for each row affected by a transaction having the transaction identifier, stamping each row affected by the transaction with the transaction counter number, and releasing any row locks.

4. The method of claim 1, further comprising:
performing a row lookup when one or more row lookup records are uncommitted, such that the one or more row lookup records are uncommitted when they are not stamped with the transaction counter number.

5. The method of claim 4, further comprising:
independently processing the one or more uncommitted row lookup records while the one or more uncommitted records are not externally recognizable to queries.

6. A computer-implemented method of managing digital data for a plurality of tenants to software instances, each tenant comprising a group of users who share a common access with a specific set of privileges to a software instance of an application, wherein each of the instances is implemented on at least one of a plurality of instance nodes of the server system in communication with each other, wherein the managing includes managing multiversion concurrency control of different instances of the digital data which may be stored in one or more storage device locations, wherein a transaction is not initially recognizable to one or more queries, the method comprising:
latching, at the server system a bucket for a transaction identifier that is associated with each update of a record stored on the server system to control access to record chains, wherein the bucket includes the hash of the transaction identifier, and resolving any hash collisions from the hashing the transaction identifier;

setting, at the server system, a transaction counter number in the transaction header identifying data to a transaction number;

unlatching, at the server system, the bucket and updating, at the server system, the transaction counter number so as to make the transaction recognizable, at the server system, to one or more queries received by the server system; and releasing, by a transaction manager at the server system, a transaction lock on the transaction number to unblock the transaction number so as to make it recognizable, at the server system, to the one or more queries received by the server system.

7. The method of claim 6, further comprising:
hashing the transaction identifier.

8. The method of claim 6, further comprising:
performing a direct lookup of the transaction identifier.

9. The method of claim 6, wherein the setting the transaction counter number in the transaction header identifying data further comprises:
releasing all row locks associated with the transaction.

10. A computer-implemented method of managing digital data for a plurality of tenants to software instances, each tenant comprising a group of users who share a common access with a specific set of privileges to a software instance of an application, wherein each of the instances is implemented on at least one of a plurality of instance nodes of a server system in communication with each other, wherein the managing includes managing multiversion concurrency control of different instances of the digital data which may be stored in one or more storage device locations communicatively coupled to the server system as records, each of which is identified by a key that includes identification of one or more rows in a table of a database, and wherein a transaction is recognizable to one or more queries, the method comprising:

latching, at the server system, a hash bucket for a transaction identifier that is associated with each update of a record stored on the server system to control access to record chains;

setting, at the server system, a current key hash value and a current sequence number in a transaction header identifying data associated with a transaction of the record, wherein the sequence number identifies a position in a sequence of a row of the records, and unlatching the hash bucket for the transaction identifier;

determining at the server system from row lock records and the row version records, whether there is a row identifier in at least one of the row version records and the row lock records where a transaction number is the same as the transaction identifier and a sequence number is the same as a current sequence number being reviewed by the server system; and stamping, at the server system, the transaction counter number on the current row version record so that the current row version record is committed when the transaction number is the same as the transaction identifier and the sequence number is the same as the current sequence number.

11. The method of claim 10, further comprising:
when the row identifier has a transaction number that does not equal the transaction identifier, or when the row identifier has a transaction number equals the transaction identifier and the sequence number is greater than or equal to the current sequence number, moving to the next row version in the records.

12. The method of claim 10, wherein the stamping occurs when the one of the row lock records is not stamped by a concurrent lookup operation.

13. The method of claim 10, further comprising:
when the transaction number is the same as the transaction identifier and the sequence number is the same as a current sequence number for one of the row lock records, removing the one of the row lock records from the one or more storage device locations.

14. The method of claim 10, wherein the stamping occurs when the one of the row version records is not stamped by a concurrent lookup operation.

15. The method of claim 10, further comprising:
determining whether there is a previous sequence number.

16. The method of claim 15, further comprising:
setting the current key hash value to a previous key hash value;
setting the current sequence number to the previous sequence number; and
unlatching a key bucket, wherein the latch controls access to the record chains.

17. The method of claim 15, further comprising:
when the previous sequence number reaches a terminal value, stopping the review of the record chain.

18. The method of claim 10, further comprising:
hashing a transaction identifier; and
resolving any hash collisions from the hashing the transaction identifier.

19. The method of claim 10, further comprising:
performing a direct look-up of the transaction identifier.

20. A computer-implemented method of managing digital data for a plurality of tenants to software instances, each tenant comprising a group of users who share a common access with a specific set of privileges to a software instance of an application, wherein each of the instances is implemented on at least one of a plurality of instance nodes of a server system in communication with each other, wherein the managing includes managing multiversion concurrency control of different instances of the digital data which may be stored in one or more storage device locations communicatively coupled to the server system as records, each of which is identified by a key that includes identification of one or more rows in a table of a database, and wherein a transaction is recognizable to one or more queries, the method comprising:

hashing the key at the server system;
latching, at the server system, a key hash bucket for the key and resolving any collisions from the hashing;
searching, at the server system, a key's row version chain of records to determine a newest recognizable row version record based on a snapshot transaction counter number, the key's self identifier number, and a command identification statement, the searching comprising:
determining, at the server system, whether a row of the row version chain of records is uncommitted;
when the row is uncommitted, reading, at the server system, a transaction counter number value from the transaction header identifying information; and
when the transaction counter number is valid by having a row transaction counter that is the same as the transaction counter number, stamping, at the server system, the transaction counter number on the current row version record and marking the current row version record as committed.

21. The method of claim 20, further comprising:
determining whether the row version record is recognizable to a multiversion concurrency control (MVCC); and
stopping the search when the row version record is recognizable to the MVCC.

22. The method of claim 20, further comprising:
determining whether the row version record is recognizable to a multiversion concurrency control (MVCC); and
advancing to the next row version record when one exists or stopping the search.

23. A server system to manage digital data for a plurality of tenants to software instances, each tenant comprising a group of users who share a common access with a specific set of privileges to a software instance of an application, wherein each of the instances is implemented on at least one of a plurality of instance nodes of the server system in communication with each other, and wherein the managing includes managing multiversion concurrency control of different instances of the digital data which may be stored in one or more storage device locations communicatively coupled to the server system as records, each of which is identified by a key that includes identification of one or more rows in a table of a database, comprising:
the server system to:
receive a query regarding a transaction counter number;
use the updated transaction header identifying data as an instance of multiversion concurrency control information by the received query when the key lookup encounters an uncommitted row for a transaction number in the one or more storage device locations;
perform a key lookup in the table of the database based on the received query;
when the key lookup encounters an uncommitted row, the server system accesses, at the one or more storage device locations communicatively coupled to the server system, a corresponding transaction header identifying data to identify a data array element in the one or more storage device locations to determine whether a transaction number is committed, and determine its corresponding transaction counter number; and
stamp the transaction counter number on the row version record in the one or more storage device locations.

24. The system of claim 23, wherein the server system accesses the corresponding transaction header in the one or more storage device locations by identifying the data array element using a transaction header index field on the row version record and a row lock record.

25. The system of claim 23, wherein the server system stamps each row affected by the transaction with the transaction counter number and releases any row locks for each row affected by a transaction having the transaction identifier in the one or more storage device locations.

26. The system of claim 23, wherein the server system performs a row lookup in the one or more storage device locations when one or more row lookup records are uncommitted, such that the one or more row lookup records are uncommitted when they are not stamped with the transaction counter number.

27. The system of claim 26, wherein the server system independently processes the one or more uncommitted row lookup records of the one or more storage device locations while the one or more uncommitted records are not externally recognizable to queries.

28. A server system to manage digital data for a plurality of tenants to software instances, each tenant comprising a group of users who share a common access with a specific set of privileges to a software instance of an application, wherein each of the instances is implemented on at least one of a plurality of instance nodes of the server system in communication with each other, wherein the managing includes managing multiversion concurrency control of different instances of the digital data which may be stored in one or more storage device locations, wherein a transaction is not initially recognizable to one or more queries, comprising:
the server system to:
latch a bucket for a transaction identifier that is associated with each update of a record stored on the server system to control access to record chains in the one or more storage device locations, wherein the bucket includes the hash of the transaction identifier, and resolve any hash collisions from the hashing the transaction identifier;
set a transaction counter number in the transaction header identifying data to a transaction number in the one or more storage device locations;
unlatch the bucket and updating a system read transaction counter number in the one or more storage device locations so as to make the transaction recognizable to one or more queries received by the server system; and
release, by a transaction manager of the server system, a transaction lock on the transaction number in the one or more storage device locations to unblock the transaction number so as to make it recognizable to the one or more queries received by the server system.

29. The system of claim 28, wherein the server system hashes the transaction identifier.

30. The system of claim 28, wherein the server system performs a direct lookup of the transaction identifier in the one or more storage device locations.

31. The system of claim 28, wherein the server system sets the transaction counter number in the transaction header identifying data in the one or more storage device locations and releases all row locks associated with the transaction.

32. A server system to manage digital data for a plurality of tenants to software instances, each tenant comprising a group of users who share a common access with a specific set of privileges to a software instance of an application, wherein each of the instances is implemented on at least one of a plurality of instance nodes of the server system in communication with each other, wherein the managing includes managing multiversion concurrency control of different instances of the digital data which may be stored in one or more storage device locations communicatively coupled to the server system as records, each of which is identified by a key that includes identification of one or more rows in a table of a database, and wherein a transaction is recognizable to one or more queries, comprising:
the server system to:
latch a hash bucket for a transaction identifier that is associated with each update of a records stored on the server system to control access to record chains in the one or more storage device locations;
set, in the one or more storage device locations, a current key hash value and a current sequence number in a transaction header identifying data associated with a transaction of the record, wherein the sequence number identifies a position in a sequence of a row of the records, and unlatch the hash bucket for the transaction identifier;

determine, from row lock records and the row version records, whether there is a row identifier in at least one of the row version records and the row lock records where a transaction number is the same as the transaction identifier and a sequence number is the same as a current sequence number in the one or more storage device locations being reviewed by the server system; and stamp the transaction counter number on the current row version record in the one or more storage device locations so that the current row version record is committed when the transaction number is the same as the transaction identifier and the sequence number is the same as the current sequence number.

33. The system of claim 32, wherein when the row identifier has a transaction number that does not equal the transaction identifier, or when the row identifier has a transaction number equals the transaction identifier and the sequence number is greater than or equal to the current sequence number, the server system moves to the next row version in the records.

34. The system of claim 32, wherein the stamping by the server system occurs when the one of the row lock records in the at least one server system is not stamped by a concurrent lookup operation.

35. The system of claim 32, wherein when the transaction number is the same as the transaction identifier and the sequence number is the same as a current sequence number for one of the row lock records, the server system removes the one of the row lock records from the one or more storage device locations.

36. The system of claim 32, wherein the stamping by the server system occurs when the one of the row version records of the one or more storage device locations is not stamped by a concurrent lookup operation.

37. The system of claim 32, wherein the server system determines whether there is a previous sequence number.

38. The system of claim 37, wherein the server system sets the current key hash value to a previous key hash value, sets the current sequence number to the previous sequence number, and unlatches a key bucket, wherein the latch controls access to the record chains in the one or more storage device locations.

39. The system of claim 37, wherein when the previous sequence number reaches a terminal value, the server system stops the review of the record chain in the one or more storage device locations.

40. The system of claim 32, wherein the server system hashes a transaction identifier and resolves any hash collisions from the hashing the transaction identifier.

41. The system of claim 32, wherein the server system performs a direct look-up of the transaction identifier.

42. A server system to manage digital data for a plurality of tenants to software instances, each tenant comprising a group of users who share a common access with a specific set of privileges to a software instance of an application, wherein each of the instances is implemented on at least one of a plurality of instance nodes of the server system in communication with each other, wherein the managing includes managing multiversion concurrency control of different instances of the digital data which may be stored in one or more storage device locations that are communicatively coupled to the server system as records identified by a key that includes identification of one or more rows in a table of a database, and wherein a transaction is recognizable to one or more queries, comprising:

the server system to:
hash the key;
latch a key hash bucket for the key and resolving any collisions from the hashing;
search a key's row version chain of records in the one or more storage device locations to determine a newest recognizable row version record based on a snapshot transaction counter number, the key's self identifier number, and a command identification statement, wherein the server system:
determines whether a row of the row version chain of records is uncommitted;
read a transaction counter number value from the transaction header identifying information when the row is uncommitted; and
stamp the transaction counter number on the current row version record and marking the current row version record as committed when the transaction counter number is valid by having a row transaction counter that is the same as the transaction counter number.

43. The system of claim 42, wherein the server system determines whether the row version record is recognizable to a multiversion concurrency control (MVCC) and stops the search when the row version record is recognizable to the MVCC.

44. The system of claim 42, wherein the server system determines whether the row version record is recognizable to a multiversion concurrency control (MVCC) and advances to the next row version record when one exists or stopping the search.

* * * * *